(12) United States Patent
Butterworth et al.

(10) Patent No.: US 12,721,366 B2
(45) Date of Patent: Sep. 1, 2026

(54) MEDIUM/LOW GLYCAEMIC INDEX PRODUCTS AND METHODS

(71) Applicants: KING'S COLLEGE LONDON, London (GB); NEW-FOOD INNOVATION LTD, Derbyshire (GB)

(72) Inventors: Peter J. Butterworth, London (GB); Cathrina H. Edwards, London (GB); Peter R. Ellis, London (GB); Sandra Hill, Derbyshire (GB); Alan Marson, Derbyshire (GB); Jacek Obuchowicz, Derbyshire (GB)

(73) Assignees: King's College London (GB); New-Food Innovations, Ltd. (GB)

( * ) Notice: Subject to any disclaimer, the term of this patent is extended or adjusted under 35 U.S.C. 154(b) by 884 days.

(21) Appl. No.: 16/964,094

(22) PCT Filed: Feb. 1, 2019

(86) PCT No.: PCT/GB2019/050284
§ 371 (c)(1),
(2) Date: Jul. 22, 2020

(87) PCT Pub. No.: WO2019/155190
PCT Pub. Date: Aug. 15, 2019

(65) Prior Publication Data

US 2021/0037861 A1 Feb. 11, 2021

(30) Foreign Application Priority Data

Feb. 6, 2018 (GB) ..................................... 1801909

(51) Int. Cl.
*A23L 11/00* (2025.01)
*A21D 13/045* (2017.01)
(Continued)

(52) U.S. Cl.
CPC ............ *A23L 11/05* (2016.08); *A21D 13/045* (2017.01); *A21D 13/06* (2013.01); *A21D 13/80* (2017.01);
(Continued)

(58) Field of Classification Search
CPC .......... A23L 11/05; A23L 11/31; A23L 11/60; A21D 13/045; A21D 13/06; A21D 13/80
See application file for complete search history.

(56) References Cited

U.S. PATENT DOCUMENTS

2002/0168463 A1* 11/2002 Villagran ................ A23L 19/15 426/637
2002/0197350 A1 12/2002 Akazawa
(Continued)

FOREIGN PATENT DOCUMENTS

EP 0834260 4/1998
JP 1247056 10/1989
(Continued)

OTHER PUBLICATIONS

Bello-Perez, Luis A., et al., In vitro starch digestibility of fresh and sun-dried faba beans (*Vicia faba* L.); Database BIOSIS [online] Biosciences Information Services; Jun. 2007; database accession No. PREV200700423620 abstract.
(Continued)

*Primary Examiner* — Katherine D Leblanc
(74) *Attorney, Agent, or Firm* — Nicholas J. Landau; Maynard Nexsen PC

(57) ABSTRACT

The invention relates to a process comprising (a) providing a quantity of plant material; (b) heating the material of (a) in aqueous medium to a temperature of 75 to 105° C.; (c) physically disrupting the material of (b); (d) processing the physically disrupted material of (c) to enrich for cells and/or cell clusters; and (e) drying the material of (d). The invention
(Continued)

amylase
maltose
starch also relates to a product, which comprises at least 30% or more intact plant cells, which comprises 15% or less water by weight, which has a particle size in the range 75-500 μm, characterised in that the product comprises at least 30% resistant starch as a proportion of total starch. The invention also relates to foodstuffs.

14 Claims, 11 Drawing Sheets

(51) Int. Cl.

| | |
|---|---|
| ***A21D 13/06*** | (2017.01) |
| ***A21D 13/80*** | (2017.01) |
| ***A23L 11/30*** | (2016.01) |
| ***A23L 11/60*** | (2025.01) |

(52) U.S. Cl.
CPC ............... *A23L 11/31* (2016.08); *A23L 11/60* (2021.01); *A23V 2002/00* (2013.01)

(56) References Cited

U.S. PATENT DOCUMENTS

| | | | | |
|---|---|---|---|---|
| 2003/0045504 | A1* | 3/2003 | Brown | A23L 33/20 514/60 |
| 2007/0254090 | A1 | 11/2007 | Wang | |
| 2009/0092706 | A1* | 4/2009 | van der Hijden | A23L 33/00 426/61 |
| 2012/0201948 | A1 | 8/2012 | Huber | |
| 2012/0207881 | A1* | 8/2012 | Noort | A23L 7/117 426/534 |

FOREIGN PATENT DOCUMENTS

| | | |
|---|---|---|
| JP | 2004024028 | 1/2004 |
| JP | 2006149254 | 6/2006 |
| JP | 2008263800 | 11/2008 |
| WO | 2001010242 | 2/2001 |
| WO | 2017093868 | 6/2017 |

OTHER PUBLICATIONS

Garcia-Alonson, A., et al., "Resistant starch and potential glycaemic index of raw and cooked legumes (lentils, chickpeas and beans)" Database FSTA [Online] International Food Information Service; database accession No. FS-1998-09-Jp2137; abstract.

Georgopoulos, N., "International Search Report and Written Opinion—International patent application No. PCT/GB2019/050284," Apr. 30, 2019.

Bird, Caroline, "British Search Report—application No. GB1801909.1," Aug. 6, 2018.

Bird, Caroline, "British Search Report—application No. GB1801909.1," Mar. 20, 2019.

Raigond, Pinky et al., "Resistant Starch in Food," chapter in J.-M. Mérillon, K. G. Ramawat (eds.), "Bioactive Molecules in Food, Reference Series in Phytochemistry" (2019) Springer Nature Switzerland AG pp. 814-846.

Jenkins et al., "Glycemic index of foods: A physiological basis for carbohydrate exchange" American Journal of Clinical Nutrition, 1981, 34:362-366.

Englyst et al., "Classification and Measurement of Nutritionally Important Starch Fractions" European Journal of Clinical Nutrition, 1992, 46:533-550.

Livesey et al., "Dietary glycemic index and load and the risk of type 2 diabetes: A systematic review and updated meta-analyses of prospective cohort studies" Nutrients, 2019, 11, 1280: 1-51.

Ucar & Kizil, "A review on healthier bread making: Focusing on the underlying mechanisms for decreasing glycemic index" Food Reviews International, 2025, 41:1469-1508.

Bajka et al., "The impact of replacing wheat flour with cellular legume powder on starch bioaccessibility, glycaemic response and bread roll quality: A double-blind randomised controlled trial in healthy participants" Food Hydrocolloids, 2021, 114:106565.

Bajka et al., "Enhanced secretion of satiety-promoting gut hormones in healthy humans after consumption of white bread enriched with cellular chickpea flour: A randomized crossover study" The American Journal of Clinical Nutrition, 2023, 117:477-489.

Roman & Martinez, "Structural basis of resistant starch (RS) in bread: Natural and commercial alternatives" Foods, 2019, 8:267.

Jenkins et al., "Association of glycaemic index and glycaemic load with type 2 diabetes, cardiovascular disease, cancer, and all-cause mortality: a meta-analysis of mega cohorts of more than 100000 participants" Lancet Diabetes Endocrinol, 2024; 12:107-18.

Le Leu et al., "Effect of high amylose maize starches on colonic fermentation and apoptotic response to DNA-damage in the colon of rats" BioMed Central Ltd, Nutrition & Metabolism, 2009, 6:11.

Edwards et al., "Manipulation of starch bioaccessibility in wheat endosperm to regulate starch digestion, postprandial glycemia, insulinemia, and gut hormone responses: a randomized controlled trial in healthy ileostomy participants" Am J Clin Nutr, 2015, 102:791-800.

* cited by examiner

FIGURE 1
amylase
maltose
starch
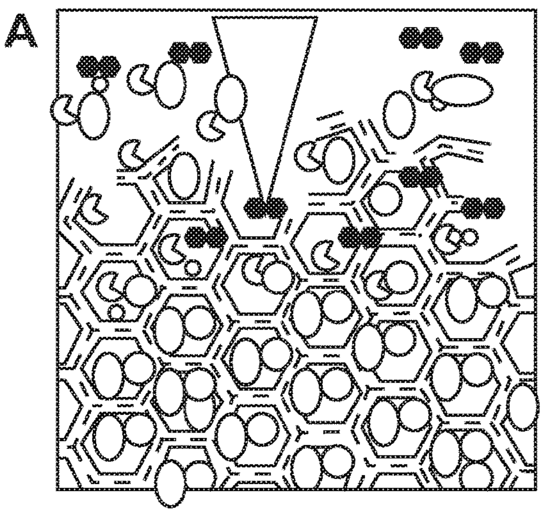
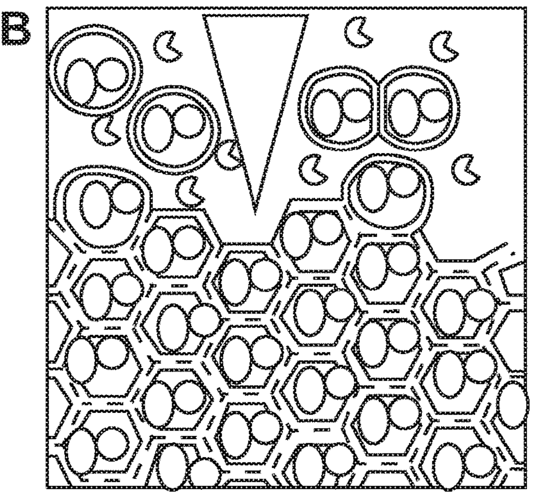
FIGURE 2
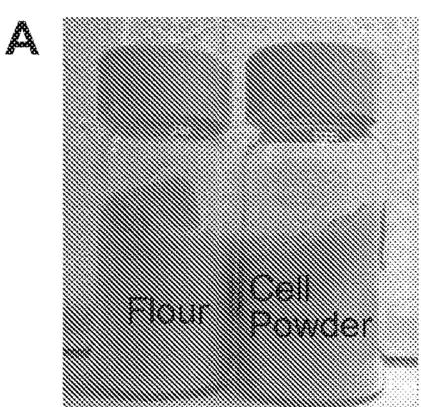
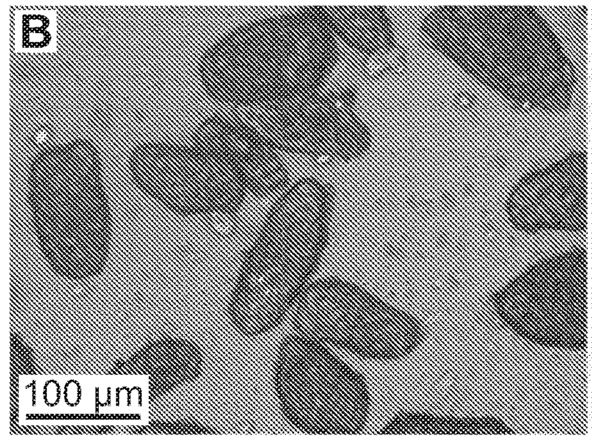
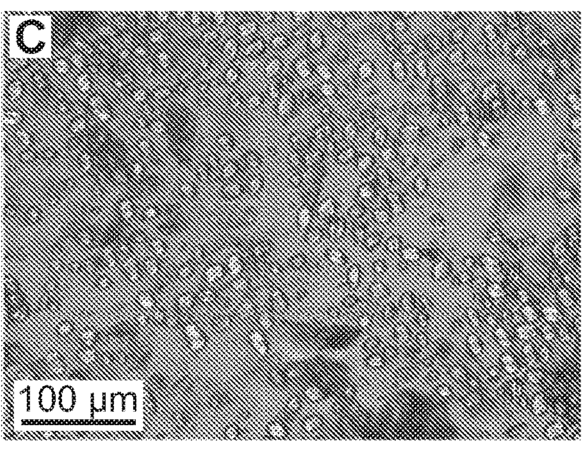

FIGURE 3
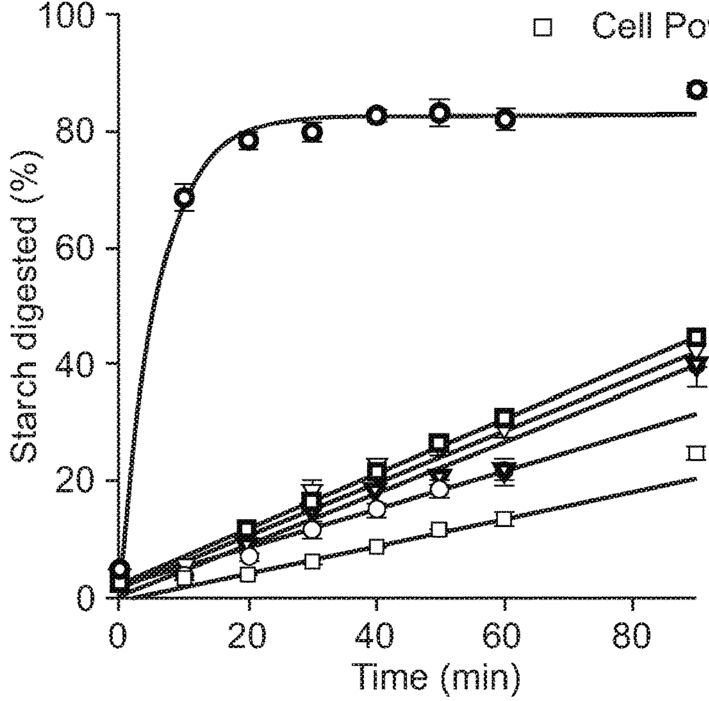
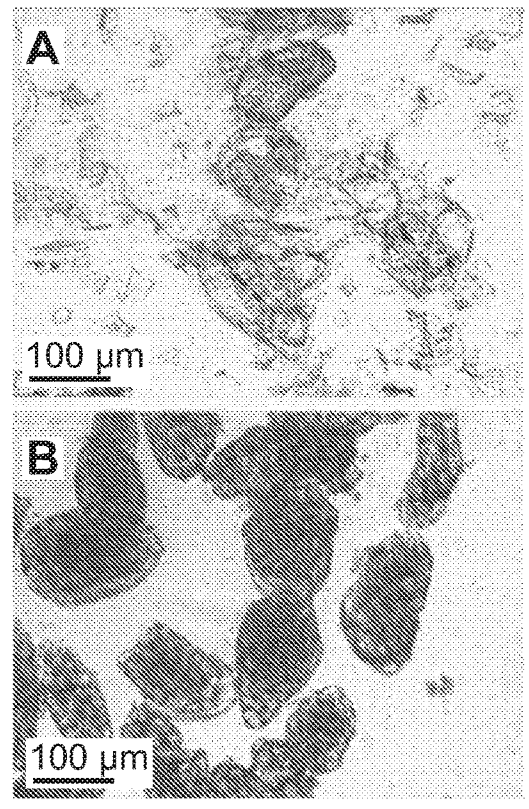

FIGURE 4

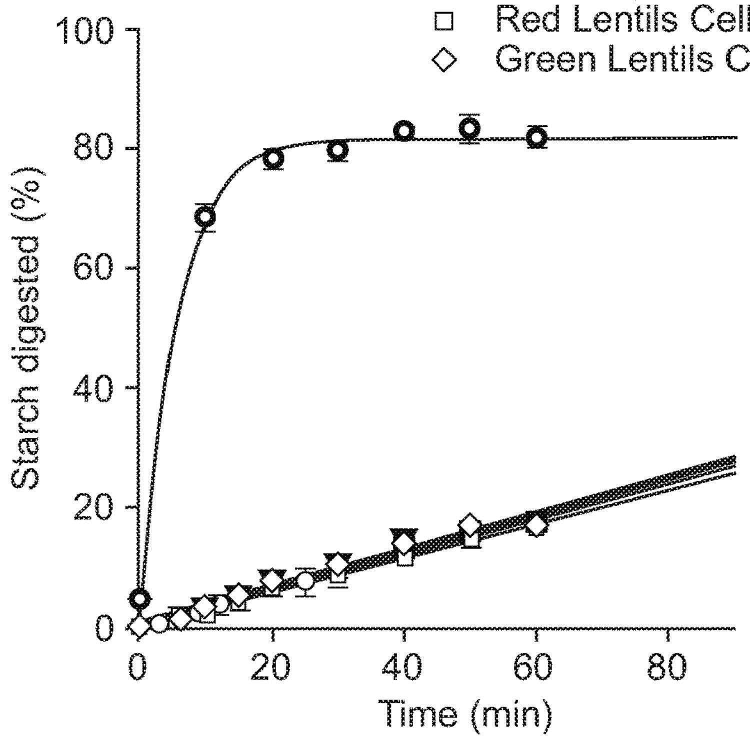
Chickpea Cell Powder
Boiled Chickpea Flour (Reference)
Yellow-Split Pea Cell Powder
Butterbean Cell Powder
Green Split Pea Cell Powder
Red Lentils Cell Powder
Green Lentils Cell Powder
Starch digested (%)
100
80
60
40
20
0
Time (min)
0
20
40
60
80

Green Lentils
Butter Beans
Yellow Split peas
Green Split peas
Red Lentils

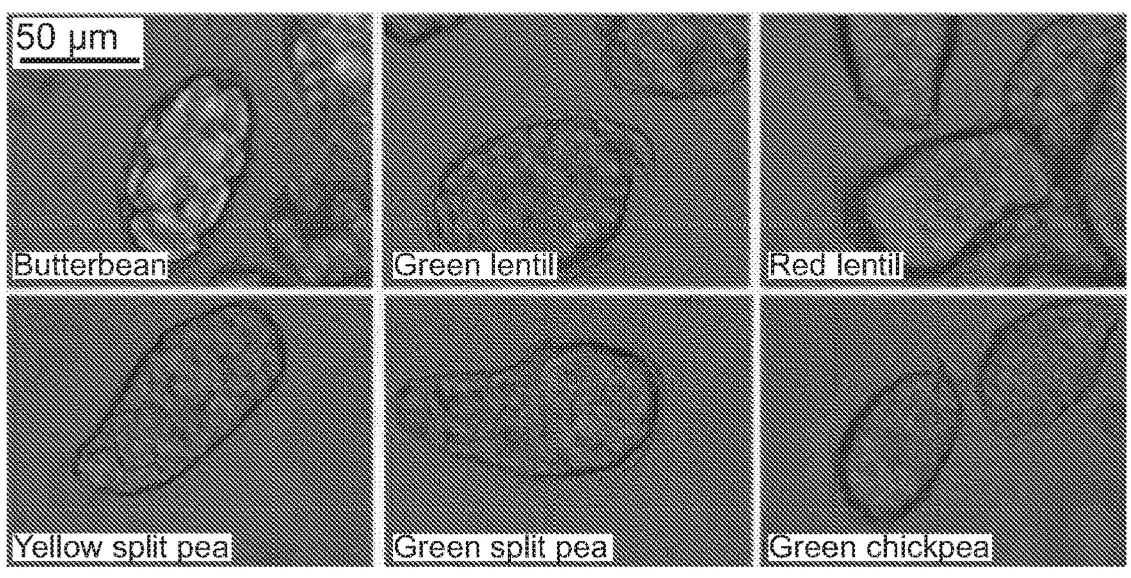
50 μm
Butterbean
Green lentil
Red lentil
Yellow split pea
Green split pea
Green chickpea FIGURE 11A
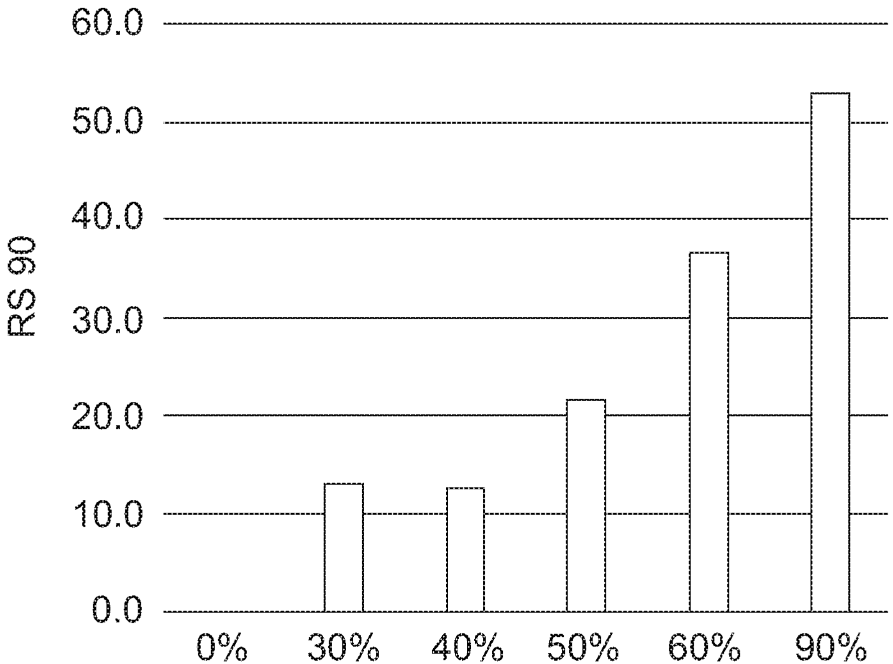
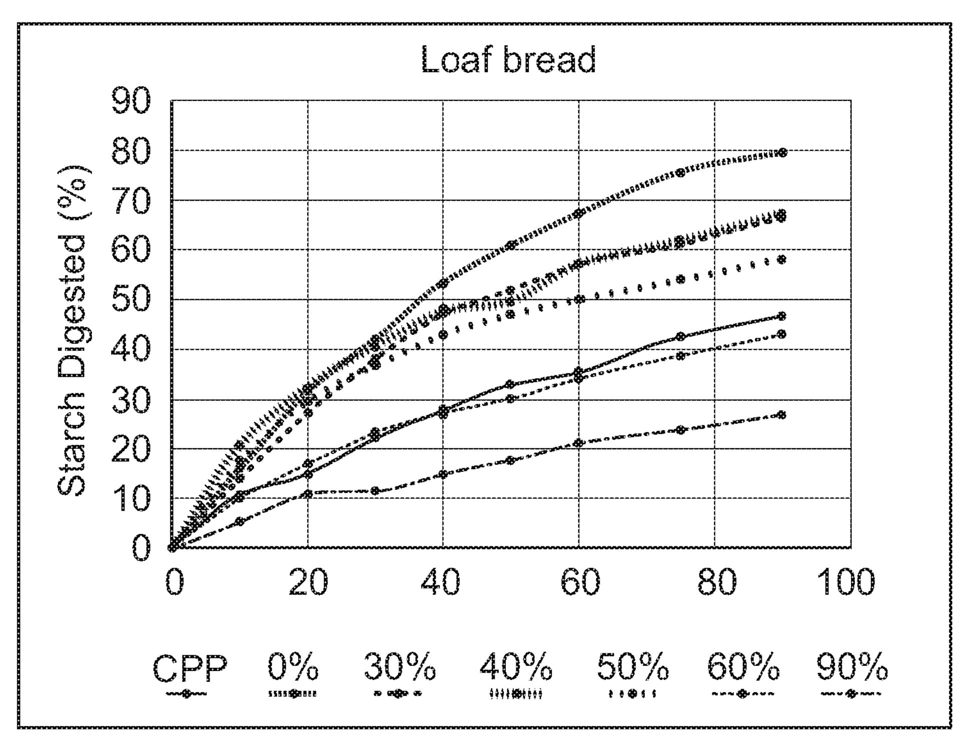

FIGURE 11B
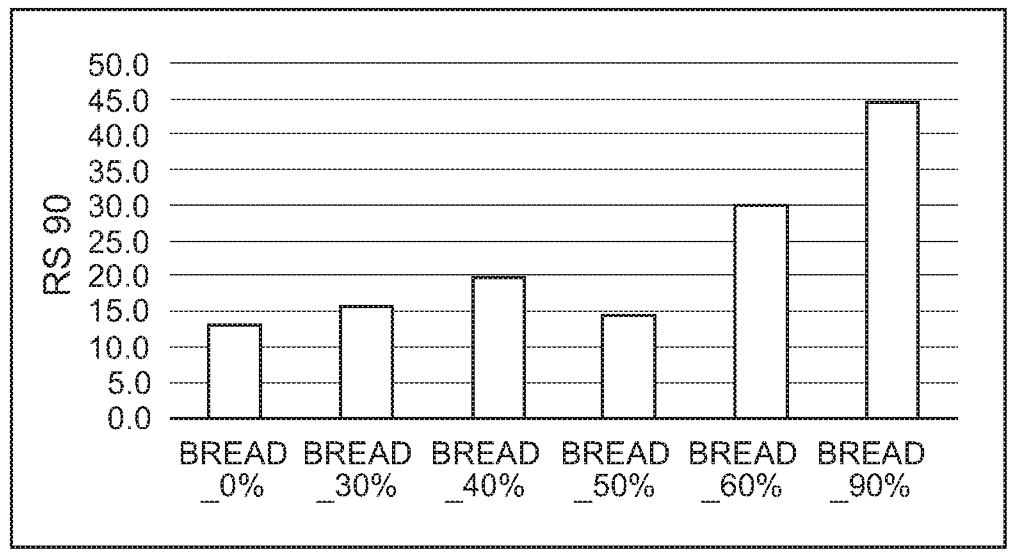
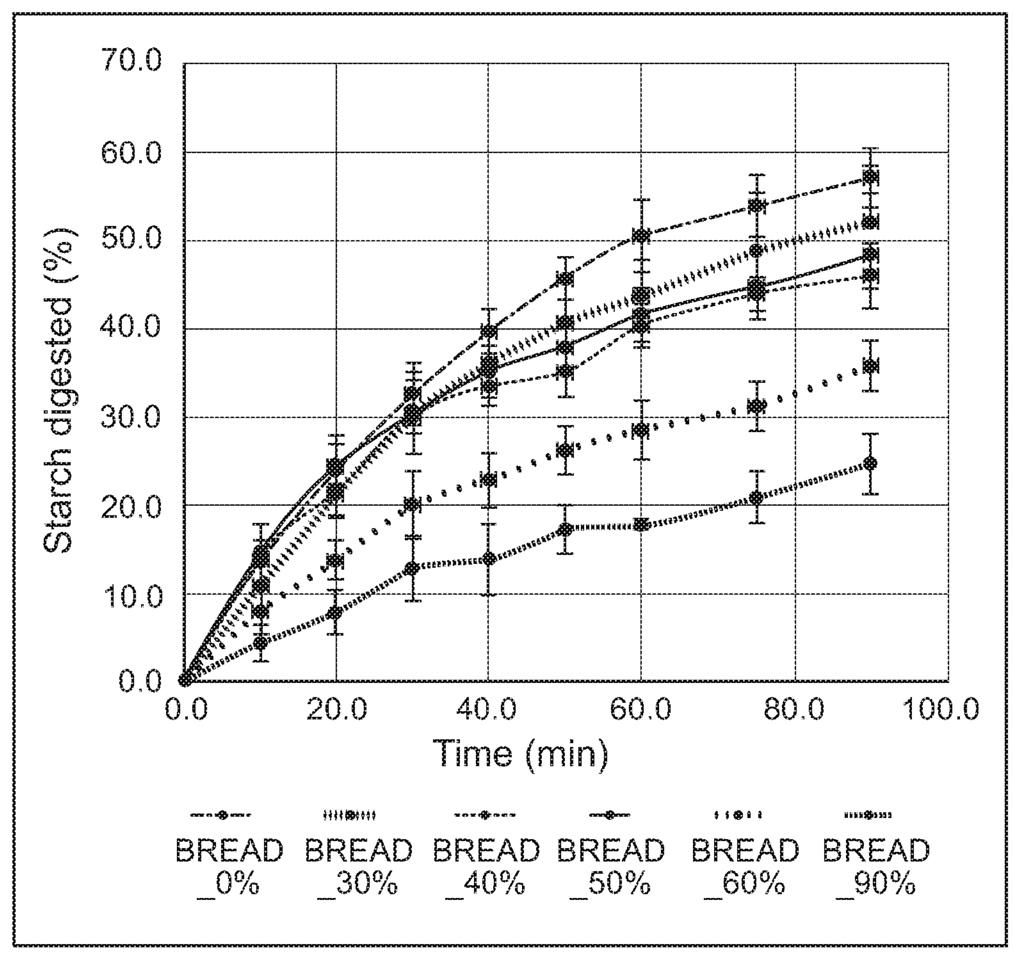

| | 0% Chickpea | 30% Chickpea | 40% Chickpea | 50% Chickpea |
|---|---|---|---|---|
| Specific Volume | 3.01 ± 0.17 | 2.48 ± 0.08 | 1.86 ± 0.02 | 1.60 ± 0.03 |

MEDIUM/LOW GLYCAEMIC INDEX PRODUCTS AND METHODS

CROSS-REFERENCE TO RELATED APPLICATIONS

This application is a national stage under 35 U.S.C. 371 of International Application No. PCT/GB2019/050284 having an international filing date of Feb. 1, 2019 (currently published). International Application No. PCT/GB2019/050284 cites the priority of GB Patent Application No. 1801909.1, filed Feb. 6, 2018 (abandoned).

FIELD OF THE INVENTION

The invention relates to medium/low glycaemic index products, most suitably low glycaemic index products, such as food products or food ingredients, and to methods for making them.

BACKGROUND TO THE INVENTION

Worldwide interest in food products delivering "slow-release" or "sustained" energy has increased sharply, enhanced by the global success of Belvita™ breakfast biscuits. Although many companies are thinking about slow energy and blood glucose control in relation to diabetes prevention, in fact the biggest opportunity for the food and beverage industry lies in providing sustained energy to the mass market. Product developers are turning to a broader range of cereal crops, especially whole grains, such as oats, barley, sorghum and millet, which can used to produce foods containing starches that are slowly digested and thus elicit lower postprandial blood glucose concentrations in humans (i.e., low glycaemic foods).

Leguminous starchy crops, notably the dry seed pulses such as chickpeas, also have desirable nutritional properties. However, pulse ingredients and products are under-utilised within the food industry, including both UK and global markets. Globally, around 13 m tonnes of chickpea are grown.

The nutritional and potential long-term health benefits of consuming pulses have been well-documented. Pulses have a high fibre content, slowly-digestible starch and a low glycaemic index and have shown considerable promise in the dietary prevention and management of cardiovascular disease, diabetes and obesity. They are also an affordable and accessible source of starch, protein, and dietary fibre, and are included in most dietary guidelines. Given their nutritional properties, pulses could play a significant role in enhancing the nutritional status of the global population. However, they are currently under-utilised both in the UK and globally (i.e., in 2013, 74 m tonnes of pulses were produced globally, and 15.3 tonnes sold in the UK).

There is a lack of awareness about pulses, with 12% of the global population not familiar with them, and of those consumers who are aware, only 50-60% of them regularly eat pulses. One issue is that the additional processing of pulses is time-consuming, with most people in Western markets such as the UK consuming pulses in the form of frozen peas and processed (canned) pulses. Consequently, the development of convenience foods such as snacks and ready-meals based on pulses provides a powerful means of encouraging intake. Indeed, food manufacturers in many countries are already turning to pulse flours to enhance protein levels, eliminate gluten and boost the micronutrient contents of their products. One major disadvantage of the way pulses are commercially milled into flours, however, is the loss of the low-glycaemic property—a highly desirable attribute with regard to reducing risk factors associated with heart disease and type 2 diabetes.

However, when pulses are processed under conditions that do not provide a favourable environment for cell separation (e.g. conventional flour milling) the vast majority of cells rupture, and the intracellular starch becomes more readily available for digestion, hence the low-glycaemic property is lost. This is a drawback with existing methods of processing.

Edwards et al 2015 (Food Funct., 2015, vol 6, page 3634) disclose a study of starch gelatinisation behaviour in hydrothermally-processed plant food tissues and implications for in vitro digestibility. The authors showed that the swelling and gelatinisation of encapsulated starch was significantly hindered in intact chickpea tissue (i.e. structural intact cell walls) that had been hydrothermally processed. This effect was linked to a lower susceptibility to amylolysis during digestion. A number of factors may restrict the swelling and gelatinisation of the encapsulated starch. This paper does not teach commercial uses of chickpea powder containing intact cells with a high proportion of encapsulated starch. This paper does not disclose the method by which cell powder is prepared.

Prior art such as Unilever's WO 2007/006383 deploys mechanical disruption of the material whilst the cells are still strongly adhered to one another. In particular, Unilever's method can be based on disrupting dried seed. This leads to fracture of the cell walls and release of freely available starch, which gives a high glycaemic index and therefore a low quality product.

Prior art products such as those disclosed in Unilever's WO 2007/006383 contain significant amounts of free starch. This is disadvantageous since it leads to a high glycaemic index. Similarly, these prior art products contain significant amounts of plant tissue debris from broken cells. Again, this is a disadvantage because the contents of these broken cells can lead to higher rates of starch digestion and glycaemic indices.

It is a problem in the art that disrupting dried tissue has delivered unsatisfactory results such as high glycaemic index powders.

It is a problem in the art that chemical treatments have been used in order to promote cell separation, which is clearly undesirable in a product destined for the food industry.

The present invention seeks to overcome problem(s) associated with the prior art.

SUMMARY OF THE INVENTION

The inventors have studied the processing of plant materials and the problems and challenges in production of low glycaemic index foods and food ingredients. As a result of insights gained from their research, the inventors realised that modifying processing methods to promote the separation of intact cells/cell clusters transformed the resulting products from the high glycaemic index products of conventionally produced flours to surprisingly low glycaemic index products rich in resistant starch. The invention is based on this important breakthrough.

It is an important part of the invention that the order of the steps of the process is carried out as described. In particular, it is important to achieve the technical benefit of the invention that the homogenisation step is carried out only after the intercellular adhesion has been broken down. This leads to advantageously good separation of individual cells and/or cell clusters. Prior art methods have not achieved the benefits of the invention, and often this has been due to performing grinding/homogenisation steps before the cells have been sufficiently "loosened" or freed from intercellular adhesion. The invention directly addresses this problem in the art and provides excellent results as disclosed herein.

It is an important feature of the invention that the hydrothermal treatment step is carried out at the disclosed point in the overall process. This assists in causing intercellular pectin to be solubilised. The technical effect of this is to promote separation of intact cells. Suitably this step is carried out for time sufficient to weaken the intercellular adhesion so that cells can separate.

It is an important feature of the invention that the processing of the physically disrupted material to enrich for cells and/or cell clusters (e.g. extraction/enrichment of cells or cell clusters) is carried out on the wet material before drying. The inventors believe that prior art techniques, for example involving spray drying, are themselves disruptive of the cells and the method of the invention advantageously avoids this problem.

It is an advantage of the invention that excellent separation of cells and/or cell clusters is achieved in the end product.

The creation of a dry powder which retains the cellular integrity and starch resistance to the high degree demonstrated (e.g. more than 60% intact cells and <40% starch digested at 90 min) is new. Prior art attempts at producing a dry powder have not achieved this level of starch resistance/cellular integrity. Thus the invention delivers technical benefits as described herein.

Thus in a broad aspect the invention provides a process comprising (a) providing a quantity of plant material;

(b) heating the material of (a) in aqueous medium to a temperature of 75 to 105° C.;

(c) physically disrupting the material of (b);

(d) processing the physically disrupted material of (c) to enrich for cells and/or cell clusters; and (e) drying the enriched material of (d).

In one aspect, the invention provides a process comprising (a) providing a quantity of plant material;

(b) heating the material of (a) in aqueous medium to a temperature of 75 to 105° C.;

(c) physically disrupting the material of (b);

(d) processing the physically disrupted material of (c) by sieving to obtain particles in the size range 20 μm to 4 mm; and (e) drying the material of (d).

Sieving as taught herein provides the beneficial feature of enriching for cells and/or cell clusters.

Suitably step (b) is carried out for sufficient time to solubilise intercellular pectin.

Suitably step (b) is carried out for 30 to 120 minutes.

Suitably step (b) is carried out for 24 to 120 minutes.

Suitably step (b) is carried out for 20 to 120 minutes.

Shorter times for step (b) may save energy/time e.g. when using plant material of smaller size(s).

Suitably the plant material is first subjected to hydrothermal processing.

Suitably hydrothermal processing comprises heating the material of (a) in aqueous medium to a temperature of 75 to 115° C. More suitably hydrothermal processing comprises heating the material of (a) in aqueous medium to a temperature of 76 to 115° C., even more suitably 80 to 115° C., most suitably 90 to 115° C. Higher maximal temperature (115° C.) may help to reduce heating times (if desired).

More suitably hydrothermal processing comprises heating the material of (a) in aqueous medium to a temperature of 75 to 105° C. More suitably hydrothermal processing comprises heating the material of (a) in aqueous medium to a temperature of 76 to 105° C., even more suitably 80 to 105° C., most suitably 90 to 105° C. Lower maximal temperature (105° C.) may help retain RS and/or may permit longer heating times (if desired).

Hydrothermal processing according to the present invention delivers the advantage of allowing for starch gelatinisation.

Hydrothermal processing according to the present invention delivers the advantage of weakening intercellular adhesion between cells in said plant material.

Hydrothermal processing according to the present invention delivers the advantage of solubilising intercellular pectin.

The inventors teach that intercellular pectin plays a primary role in the retention of intercellular adhesion.

Suitably the process is a process of producing a product, such as a powder, comprising intact plant cells. Suitably the process is a process for producing a product, such as a powder, comprising intact plant cells.

Suitably the process is a process of producing a product as described herein. Suitably the process is a process for producing a product as described herein.

Suitably the process is a method of producing a product as described herein. Suitably the process is a method for producing a product as described herein.

Suitably step (c) comprises homogenisation.

Suitably homogenisation comprises processing the material with a blender or ultraturrax homogeniser.

Suitably the blender or homogeniser is an ultraturrax dispersing instrument from IKA® England LTD, Pure Offices, Suite 1 Fountain House, John Smith Drive, Oxford Business Park, Oxford, Oxon OX4 2JY, ENGLAND, UK.

Suitably step (d) comprises sieving. More suitably step (d) comprises wet sieving. Most suitably the material being sieved comprises at least 50% water.

Suitably step (d) comprises sieving to obtain particles in the size range 20 μm to 4 mm.

Suitably the size range is 200 μm to 4 mm, which has the advantage of enriching for cell clusters/aggregates.

Suitably the size range is 65-50 μm.

Suitably the size range is 75-50 μm.

Suitably the size range is 80 to 250 μm.

Suitably the size range is 20 to 250 μm, which has the advantage of enriching for intact cells from pulses.

Suitably the size range is 50 to 250 μm, which has the advantage of enriching for intact cells with no free starch granules from chickpea.

Suitably the size range is 65 to 250 μm.

Suitably the size range is 75 to 250 μm.

Suitably the size range is 65 to 249 μm.

Suitably the size range is 75 to 249 μm.

Suitably the size range is 80 to 150 μm, which has the advantage of enriching for intact cells with no free starch. This has the further advantage of eliminating larger individual cells that can give a gritty mouthfeel when included in some food products.

Suitably step (e) comprises heating the wet material of step (d) to a temperature of 80 to 200° C. until the water content of the material is <10% by weight.

Suitably step (e) comprises spreading the material in a layer <0.5 cm thick and drying in a deck oven.

Suitably step (e) comprises roller drying.

Suitably step (e) comprises drying in a roller dryer.

Suitably step (e) comprises air drying until the water content of the material is 4 to 20% by weight.

When the water content of the material is <14% by weight, stability during storage and shelf life are advantageously increased.

Suitably step (e) comprises air drying until the water content of the material is 6 to 14% by weight.

Suitably step (e) comprises air drying until the water content of the material is 8 to 14% by weight.

Suitably step (e) comprises air drying until the water content of the material is <14% by weight.

Even lower water content can increase stability during storage and shelf life.

Suitably step (e) comprises air drying until the water content of the material is <10% by weight.

Most suitably step (e) comprises air drying until the water content of the material is <5% by weight.

In one specific embodiment, described is a product which comprises at least 30% or more intact plant cells, which comprises 15% or less water by weight, which has a particle size in the range 50-50 μm, characterised in that the product comprises at least 20% resistant starch as a proportion of total starch. In this embodiment '30% or more intact plant cells' may be 'at least 30% or more of the volume is made up of intact plant cells'. This specific embodiment relates to a product where cells are small.

Most suitably 'intact plant cells' is determined using one of the protocols as described below.

Thus, in one aspect, the invention relates to a product which comprises at least 30% or more intact plant cells, which comprises 15% or less water by weight, which has a particle size in the range 75-500 μm, characterised in that the product comprises at least 30% resistant starch as a proportion of total starch.

Suitably the product is derived from plant tissue.

Thus, in one aspect, the invention relates to a product which is derived from plant tissue, which comprises at least 30% or more intact plant cells, which comprises 15% or less water by weight, which has a particle size in the range 75-500 μm, characterised in that the product comprises at least 30% resistant starch as a proportion of total starch.

Product having low % intact plant cells such as 5% or 10% intact plant cells has high glycaemic index and is not part of the invention. Suitably product comprises at least 30% intact plant cells, which has the advantage of having a medium glycaemic index. More suitably the product comprises at least 50% intact plant cells, which has the advantage of having a superior glycaemic index. Most suitably the product comprises at least 60% intact plant cells, which has the advantage of having a low glycaemic index.

A product containing 30% intact cells provides a significant reduction in postprandial glycaemia when used in place of known flours such as commercial wheat flour in a known product such as a known high glycaemic product.

As explained in more detail below, provision of such advantageously high levels of intact cells in the products of the invention provides a correspondingly high resistant starch value such as at least 30% Resistant Starch.

Suitably said intact plant cells are intact cotyledonous (i.e. starch-containing) plant cells.

Suitably said product is at least 30% intact plant cells, more suitably at least 50% intact plant cells, more suitably at least 60% intact plant cells, more suitably at least 64% intact plant cells.

Suitably said product is at least 30% intact plant cells by weight, more suitably at least 50% intact plant cells by weight, more suitably at least 60% intact plant cells by weight, more suitably at least 64% intact plant cells by weight.

The inventors teach that if commercial wheat flour in a known high glycaemic product is substituted with a product according to the present invention such as a cell powder containing 30% intact cells (and therefore resistant starch), then the postprandial glycaemic response will be significantly lower, which is an advantage of the invention. In other words, the inventors teach that this proportion (30%) of intact cells is sufficient to significantly lower glycaemic responses when used as a substitute for commercial wheat flour in known high glycaemic products.

Suitably said intact plant cells are intact cotyledonous (i.e. starch-containing) plant cells.

Suitably the plant cells are cells of the cotyledonary tissue. Most suitably said cells are the starch-rich cells.

Suitably said product comprises at least 30% resistant starch, preferably at least 50% resistant starch, preferably at least 55% resistant starch, preferably at least 60% resistant starch, preferably at least 80% resistant starch, as a proportion of total starch.

Suitably said product comprises 30% resistant starch, preferably 50% resistant starch, preferably 55% resistant starch, preferably 60% resistant starch, preferably 80% resistant starch, as a proportion of total starch.

Suitably said resistant starch is RS1 type resistant starch.

Suitably said product comprises 35-85 g starch per 100 g product, more suitably said product comprises 45-65 g starch per 100 g product.

Suitably said product comprises 4 to 20% water by weight.

Suitably said product comprises 6 to 14% water by weight.

Suitably said product comprises 8 to 14% water by weight.

Suitably said product comprises <10% water by weight.

Suitably said product comprises <5% water by weight.

Suitably said product is a powder.

In one aspect, the invention relates to a foodstuff comprising a product as described above.

Suitably said foodstuff is selected from the group consisting of biscuit, cracker, wafer, cake, smoothie, pasta, noodle, baked goods, extruded cereal, beverage, infant nutrition product, sports nutrition product, and high protein product.

Suitably said foodstuff is selected from the group consisting of loaf bread, muffin, scone, chemically-leavened flat bread, yeast-leavened flat bread, biscuit, cupcake, flat bread and cookie.

Suitably said foodstuff is a foodstuff having a glycaemic index of less than 70, preferably 69 or less, preferably 60 or less, preferably 55 or less. Suitably said foodstuff is a foodstuff having a glycaemic index of 60 or less, preferably 55 or less.

It is an advantage of the invention that foodstuffs prepared using product(s) of the invention will contain proportionally more protein, and/or resistant starch, and/or dietary fibre than prior art products.

Using the product of the invention as a substitute for wheat flour in a foodstuff/food product has an advantageous effect on the food composition. For example, replacing wheat with product of the invention such as chickpea powder increases the fibre and protein content and lowers the calorie content of a product, which is an advantage of the invention.

Suitably said plant material comprises chickpea (*Cicer arietinum*).

Suitably said product is produced by a process as described above.

Suitably the product is obtainable by, or is obtained by, the process as described above.

DETAILED DESCRIPTION OF THE INVENTION

The inventors have realised from mechanistic studies that the low glycaemic properties of freshly cooked or canned pulses are attributed to the tendency of hydrated cotyledonous tissue of pulses to cell separate, rather than rupture. Thus, cooked pulses can consist of intact plant cells in which the cell walls provide a physical barrier that protects the intracellular starch from digestion by α-amylase (i.e. in the upper gastro-intestinal tract). However, conventional milling processes are carried out on dry plant material. Referring to FIG. 1, the tendency of dry tissue to fracture (FIG. 1A) leads to greater cell rupture and release of cellular contents (i.e. starch granules) which are readily digested (i.e. hydrolysed by alpha-amylase). According to the present invention, the tendency of tissues to separate (FIG. 1B), as is the case with hydrated cooked pulses, enables cellular integrity to be preserved, such that the encapsulated starch is not accessible for digestion by amylase.

Thus the inventors have developed a new method of processing pulses which retains, and in some embodiments enhances, their beneficial health properties. The product of this process is a dry powder (similar to flour) in which the cells are separated but remain intact and highly resistant to digestion by α-amylase. This new 'cell powder' material finds application as a food ingredient. The product of the invention can be incorporated into foods for enhanced nutritional benefit. The product of the invention may contribute to addressing major health concerns (e.g. diabetes and obesity). Also described is a commercial process that optimises the manufacturing route and also preserves the integrity of the cells such as chickpea cells. Thus we also disclose how to produce commercially sufficient quantities of cell powder.

Without wishing to be bound by theory, it is believed that starch cooked inside a cell does not gelatinise, or does not fully gelatinise. This might be due to limited water within the intact cell. This might be due to limited space for expansion of the starch granules within the intact cell. In any case, regardless of the underlying molecular mechanism, it is a benefit of the invention that it is able to deliver starch in a more semi-crystalline (native) state than prior art processes. It is a further benefit that the invention delivers starch in a less accessible form (due to the cell wall barrier effect) than prior art processes. In other words, the invention delivers the technical benefit of an increase in resistant starch compared to prior art approaches.

Prior art techniques such as Unilever's WO 2007/006383 teach carrying out homogenisation before the heating/cooking step. The present invention teaches directly against this prior art approach and delivers advantages as described herein.

"intact cell" (e.g. intact plant cell) means a complete cell wall. In other words, an intact cell does not have a disrupted cell wall. Suitably "intact cell" means that the intracellular contents are encapsulated by the plant cell wall. Suitably an intact cell has a continuous cell wall as examined by microscopy. Most suitably an intact cell has a continuous cell wall as examined by scanning electron microscopy ('SEM'). Using SEM allows for the observation of pores in materials.

"cell cluster" means a group of cells, or a clump of cells, (most suitably intact cells), which may be associated or 'stuck together' i.e. which have been broken down compared to the starting material but are not presenting as single dissociated (separated) cells. In other words, a cluster of cells is a particle of material in the product comprising two or more cells, such as 2 to 100 cells. Suitably a cluster of cells means 50 or fewer cells in a group, suitably 30 or fewer, suitably 20 or fewer, suitably 10 or fewer, suitably 8 or fewer, suitably 6 or fewer, suitably 4 or fewer, suitably 2 cells in a group.

"dry" as applied to the powder products of the invention has its normal meaning in the art i.e. dry meaning not wet or not moist (or not damp). It will be apparent to the skilled reader that, unless otherwise apparent from the context, 'dry' is not intended to mean 'anhydrous' or 'entirely free of moisture'—if those meanings are intended then those words are used. As discussed herein, the products of the invention are dried to particular water contents as desired by the operator, for example <20% water, <10% water etc. These values are consistent with a 'dry' powdered product as described.

"cell powder" is used to refer to the product of the invention in the form of powdered plant material such as legume or pulse material for example chick peas. 'cell powder' means powder comprising intact cells. Suitably the product of the invention is a powder, more suitably a cell powder.

Regarding the plant material used in the invention, particularly when seeds or plant starch storage organs are used in the process, suitably these should be mature. Mature seeds such as pulses have the potential to germinate whereas immature pulses do not. The commonly available pulses are the 'mature' dry seeds, which may be sold in the dried state or in the cooked form in cans, whereas other legumes can also be consumed as 'immature' green seeds, or as green pods with immature seeds enclosed within the pods.

"enrich" has its usual meaning in the art, i.e. to increase the amount or proportion of the material being enriched for. To enrich cells or cell clusters from a mixture or material is to increase the proportion of cells or cell clusters in that mixture or material. This may be achieved by removing other elements from the mixture or material, or may be achieved by selectively retaining the cells or cell clusters in the mixture or material. In either mechanism, the mixture or material is converted from a starting proportion of cells or cell clusters to a higher proportion of cells or cell clusters in the enriched mixture or material.

"extract" has its usual meaning in the art, i.e. to remove, take out or obtain the stated material. To extract cells or cell clusters from a mixture or material is to remove, take out or obtain those cells or cell clusters from that mixture.

Enrichment may suitably comprise extraction. Enrichment may suitably comprise purification. In this embodiment suitably intact cells or cell clusters are purified from the physically disrupted material.

In one embodiment enrichment suitably comprises separating the intact cells or cell clusters from one or more other element(s) of the physically disrupted material. Most suitably enrichment comprises separating the intact cells or cell clusters from free starch granules.

In one embodiment suitably step (d) (e.g. processing the physically disrupted material of (c) to enrich for cells and/or cell clusters) comprises separating the intact cells or cell clusters from one or more other element(s) of the physically disrupted material. Most suitably this step comprises separating the intact cells or cell clusters from free starch granules.

In some embodiments process steps are described as being carried out 'immediately after' other steps. Unless otherwise apparent from the context, 'immediately after' means without a further intervening step i.e. when step Z is carried out 'immediately after' step Y, it means that the product of step Y is processed in step Z without being further treated before step Z. In this context, unless otherwise apparent from the context, 'immediately' does not imply any special timing, i.e. it does not imply that step Z has to be commenced within a certain period of time from concluding step Y, it simply means that the next step should be step Z.

The "glycaemic index" (GI) is a physiological classification of foods based on their postprandial glycaemic response and indicates whether a standard weight of carbohydrate in food or drink (e.g. 50 g starch) raises blood glucose to high, medium or low concentrations over a stipulated time period (e.g. typically 120 min). The glycaemic index of a food is defined as the incremental area under the two-hour blood glucose response curve (AUC) following a 12-hour fast and ingestion of a food with a certain quantity of available carbohydrate (usually 50 g). The AUC of the test food is divided by the AUC of the standard (either glucose or white bread) and multiplied by 100. This is often used as a dietary tool to help manage conditions such as diabetes. Different available carbohydrates (starch and sugars) are digested and absorbed at different rates and to different extents, and the GI is an indication of how quickly each carbohydrate-based food or drink makes blood glucose levels rise after eating them.

The GI values run from 0-100 and usually uses a glucose drink, which has a GI of 100, as the reference, since these values are a ratio of the test food relative to glucose or white bread. Slowly absorbed carbohydrates have a low GI rating. A 'low' GI food is usually defined as having a value of 55 or below.

"flour" means a powder made by grinding (e.g. milling) raw grains/seeds or roots. Flour is commonly used as an ingredient to make many different foods (e.g. wheat flour is used for making bread). In the preparation of flour (e.g. from dried chickpea seeds, using milling technology), the cell walls are usually severely ruptured, so that <5% of the starch is contained within intact plant cells, although the number that survive rupture will depend on the grinding/milling conditions.

Suitably the cells are cotyledonous cells. Suitably 'intact cells' means 'intact cotyledonous cells'; 'intact plant cells' means 'intact cotyledonous plant cells'.

In this regard, the inventors have not observed intact cotyledonous (i.e. starch-containing) chickpea cells under the light microscope when inspecting commercially available chickpea flour. The level of <5% starch being contained within intact cotyledonous plant cells clarifies the eventuality that some flours might contain other types of intact cells as 'impurities'. Unless otherwise apparent from the context, the phrase 'starch is contained within . . . ' is used to clarify that intact cells from other plant tissues (i.e. skin, epidermis) that do not contain starch (i.e. non-cotyledonous cells) may be present (<5%) in flour.

Values for % intact cells refer to % of product/material being assessed. Suitably % intact cells refers to % by weight of product/material being assessed. Most suitably % intact cells refers to % of particles in the sample which are intact cells—this is explained in more detail below.

Thus, suitably unless otherwise apparent from the text, values for percentage intact cells refer to percentage of particles in the sample which are intact cells.

Throughout this document, percentage of intact cells is based on an assessment of the number of intact cells via microscopy. For example, microscopic examination of the sample enables intact cells to be identified. As a practical matter, if 2000 particles are examined under the microscope, it is then possible to say how many of those 2000 particles were intact cells and thereby arrive at a percentage of intact cells i.e. a percentage of particles in the sample which are intact cells. For example if 2000 particles are examined, and 100 of those 2000 particles are deemed to be intact cells by microscopic examination, then the sample is determined to comprise moo divided by 2000=50% intact cells (i.e. 50% of particles are intact cells).

It is possible to use a laser diffraction instrument to carry out assessment of intact cells. An exemplary protocol for this is provided below. It is important to realise that the laser diffraction instrument is a light scattering-based analysis. In other words, the raw data collected by this instrument is light scatter information. A computational step then applies a volume to these light scatter measurements. In arriving at the volume, a shape factor is applied to the raw light scatter information gathered by the instrument. The shape factor typically assumes that the particles are spherical. In this manner, the light scatter information is converted via the shape factor (i.e. via assuming spherical) into a volume. In this way, the percentage of intact cells may be expressed as "percentage by volume". Of course it will be apparent to the skilled reader that this is not necessarily the volume of the sample but is the percentage volume of intact cells in the total volume of particles analysed. For example, if the laser diffraction instrument is used to examine 10,000 particles, and 5000 of those particles are deemed to be intact cells, then a figure of 50% intact cells (50% intact cells by volume) is determined (in this example it is assumed for simplicity that all of the particles examined have on average the same calculated volumes—of course other outcomes are possible since the calculation is of percentage volume—for example the intact cells could have different volumes to the other particles analysed). In other words, the percentage of intact cells is suitably expressed as percentage of particles in the sample which are intact cells; more suitably is expressed as the percentage of volume of intact cells in the total volume of particles analysed (this is not necessarily the same as percentage of absolute volume of the sample).

The skilled worker can easily assess the % of intact cells.

In case any guidance is needed, a protocol for cell counting is provided below.

The counts are suitably expressed on a per weight material basis, as shown in equation below.

Cell Counting Protocol:

This protocol provides an indication of the proportion of intact cells in an amount of product.

1. Suspend dry product in deionised water:
   Mix the product to be analysed by inversion or stirring, then weigh out an amount of powder ('W') into a round-base test tube. Add (0.2 mL deionised water). If necessary, add a stain to aid microscopical visualisation.

2. Transfer 0.050 mL of the suspension onto a microscope slide. Use a square coverslip with a grid to seal the sample in and aid counting.
3. Secure the slide in place on the microscope stage and bring cells into focus. Count the number of intact cells per square grid using the clicker, moving across and then down to count intact cells in all squares of the grid.
4. Repeat step 3, but counting only the broken, damaged, or empty cells.
5. Repeat step 1-4 three times to achieve a total count in the region of 2000-3000.
6. Calculate the proportion of intact cells using either of the equations below:

$$\text{Intact cells \% (intact cells/total cells)} = \text{Number intact/(Number Intact + Number broken)}$$

$$\text{Intact cells (cells/weight)} = \text{Number intact/('}W\text{'/4)}$$

Cell Counting Protocol—Laser Diffraction Methodology

It may be advantageous to use laser diffraction methodology in the cell counting protocol. This has the advantage of allowing peak ratio to be used in combination with microscopy. This has the advantage of being less subjective than the microscopy counting protocol, and avoids the risk of over-estimating broken cells due to individual intact cells breaking into an unknown number of smaller pieces (i.e. cell fragments). Thus suitably the Cell Counting Protocol—Laser Diffraction Methodology is used as below:

Determination of Intact to Broken Cells

This protocol provides a quantitative estimate of the proportion of intact cells in an amount of cell product and is based on particle size data. Cells are defined as either broken or intact, based on the corresponding particle dimensions. Using volume distribution data overcomes the problem that one intact cell may be broken into many smaller particles. Light microscopy is used to verify the dimensions of individual intact cells.

Required Equipment:

Laser Diffraction Particle Size Analyser—preferably LS 13 320 Laser Diffraction Particle Size Analyzer—Beckman Coulter, which operates across size range 0.04 to 2.0 mm, or an equivalent instrument Light microscope and graticule slide for calibration Procedure:

1. Suspend the sample (e.g. dry powder/product of the invention) in deioinised water (18.2 MΩ) and vortex mix briefly to disperse.
2. Load the sample into the Particle Sizer, for example, to obtain a particle size distribution.
3. Express particle size data obtained on % volume basis. NOTE: The size data reflects the maximum dimensions of a particle (such as a cell), assuming each particle is spherical.
4. Calculate the ratio of intact to broken cells according to the following formula:

$$\%_{broken} = \frac{V_{broken}}{V_{broken} + V_{intact}}$$

where $V_{broken}$=Sum of % particles with mean dimension between 0 and <Lower Limit $$\%_{intact} = \frac{V_{intact}}{V_{broken} + V_{intact}}$$

where $V_{intact}$=Sum of % particles with mean dimension ≥Lower Limit and ≤Upper Limit Thus, $\%_{intact}+\%_{broken}=100\%$.

Thus, the % volume that falls below the lower size limit is made up of broken cells, whereas the % volume that fall between lower and upper-size limits is counted as intact.

If the sample contains cell clusters, then upper limit should be set to the maximum dimensions of clusters within the sample.

5. Use light microscopy to verify the maximum dimensions of a single cell.

Upper and Lower Limits:

Size limits and cut offs can be set by the operator. In case any guidance is required, this is discussed below.

The laser diffraction instrument uses the largest dimension and assumes it is the diameter of a sphere.

Lower limit (LL) is the lower 95% CI of the shortest dimension (width, w) of an average cell as observed by light microscopy observation, whereas upper limit (UL) is the upper 95% CI of the longest dimension (length, l) of an average cell as observed by light microscopy. As in formulae below:

$$LL = \bar{x}_w - 95\%\ CI$$

$$UL = \bar{x}_l + 95\%\ CI$$

where $\bar{x}_l > \bar{x}_w$

Species variation is shown in the example below:

| | length | width | length | width | CI length | CI width | LOWER limit | UPPER limit |
|---|---|---|---|---|---|---|---|---|
| Butter Bean | 149.40 | 111.21 | 26.17 | 13.28 | 10.47 | 5.31 | 106 | 160 |
| Yellow Split Pea | 180.13 | 106.18 | 36.18 | 20.17 | 14.47 | 8.07 | 98 | 195 |
| Green Split Pea | 180.82 | 90.77 | 46.51 | 14.34 | 18.61 | 5.74 | 85 | 199 |
| Green Chickpea | 150.86 | 70.09 | 39.49 | 13.82 | 15.80 | 5.53 | 65 | 167 |
| Green Lentil | 151.26 | 103.73 | 35.46 | 15.51 | 14.19 | 6.21 | 98 | 165 |

This technique was used to produce the data in FIG. 18.

Process

We disclose a new method of processing pulses, which retains, and in some embodiments enhances, their low-glycaemic properties. The product of this process is a dry legume powder that is suitable for incorporation into a broad range of food products. Advantages of the product of the invention include a significant capacity to benefit public health.

The process of the invention is suitably for preparation of cell powders. Suitably the process is a process of preparing cell powders. Suitably the process is a process of preparing powder comprising intact cells.

Suitably the hydrothermal, homogenisation, extraction or enrichment, and drying steps are essential in the process. This combination of steps delivers technical benefits as explained. Certain further optional steps are also described. Additional advantages gained from such optional steps are set out below.

Hydrothermal Treatment

The process of the invention comprises a first step of a hydrothermal treatment. In some embodiments a hydrothermal treatment may consist of an overnight soak (for instance in excess water at room temperature (in case any guidance is needed, room temperature may be taken to be 20±2° C. (e.g. 18 to 22° C.)) and/or subsequent boiling in excess water.

In more detail, this hydrothermal treatment step combines soaking with thermal processing and is beneficial to weaken inter-cellular adhesions to enable cell separation without cell rupture during subsequent homogenisation (e.g. in step 2).

Hydrothermal treatment is suitably heating in an aqueous medium.

For example plant material may be soaked in aqueous medium.

Aqueous medium may be water, or an aqueous solution of EDTA, NaHCO3, Na2CO3, citrate, phosphate and/or one or more enzymes such as pectinase, pectate or pectin lyase, or combinations thereof.

Suitably any chemical agent(s) used are in accordance with food regulations such as FDA regulations. For example NaHCO3 is often referred to as "baking soda" with a primary use as a leavening agent (E500 as a food additive).

More suitably aqueous medium may be water, or an aqueous solution of EDTA, NaHCO3, Na2CO3, citrate, phosphate or combinations thereof.

Most suitably chemical/enzymic agents such as EDTA, NaHCO3, Na2CO3, citrate, phosphate and/or one or more enzymes such as pectinase, pectate or pectin lyase, or combinations thereof are not used. Most suitably chemical/enzymic agents such as EDTA, NaHCO3, Na2CO3, citrate, phosphate and/or one or more enzymes such as pectinase, pectate or pectin lyase, or combinations thereof are specifically excluded.

Most suitably aqueous medium is water.

Suitably hydrothermal treatment comprises boiling in water. Most suitably hydrothermal treatment comprises boiling in excess water.

Where salts are not expressly mentioned (e.g. 'citrate'), suitably they are sodium salts (e.g. sodium citrate).

The soaking step is combined with or followed by a thermal treatment.

Without wishing to be bound by theory, the gelatinisation of chickpea starch in cotyledonous plant tissue heated in excess water starts at 67° C., but peaks at 75±0.5° C., and it concludes at 83±1° C. degrees (Edwards C H et al, 2015, Food & Function, 6: 3634). The inventors teach that it is important that the material is exposed to the peak and conclusion temperatures during hydrothermal processing so that starch gelatinisation has the greatest chance to occur. Therefore the sample temperature should suitably be in the range of 75 to 105° C. during this step.

Suitably this will comprise heating the wet mixture (for example using water). Suitably the mixture is heated to a temperature between 75 and 105° C.

More suitably the mixture is heated to a temperature between 76 and 105° C.

More suitably the mixture is heated to a temperature between 80 and 105° C.

More suitably the mixture is heated to a temperature between 90 and 105° C.

Suitably the mixture is kept within this temperature range for a period between 30 and 120 min.

It can be noted that Unilever's WO2007/006383 page 8 lines 25-27 teaches heating to 50-75° C. for up to 90 min, BUT this step is part of a different process and does not overlap with the invention. Moreover, WO2007/006383 requires the use of less preferable chemical/enzymic agents in the aqueous media listed above, whereas it is a benefit of the invention that use of such agents may be avoided.

Homogenisation

The next step is suitably homogenisation. In this step the softened pulses are homogenised, for instance using a blender to achieve a smooth 'soup-like' consistency.

Homogenisation of the hydrothermally processed mixture advantageously achieves cell separation. Suitably homogenisation occurs after the hydrothermal treatment described above (unless optionally cooling the mixture before homogenisation—see below). Most suitably homogenisation occurs immediately after the hydrothermal treatment.

Suitably the hydrothermally processed mixture is homogenised using a blender or ultraturrax instrument.

Extraction or Enrichment

The next step is suitably extraction or enrichment of cells and cell clusters from the disrupted (e.g. homogenised) material. The disrupted (e.g. homogenised) mixture is suitably processed with a sieving step, most suitably a wet-sieving step, in which a first or upper sieve (for example with an aperture between 200 and 4000 μm) is used to exclude coarse fibrous material and a second or bottom sieve (for example with an aperture between 20 and 250 μm) is used to exclude finer debris and excess surface water.

Extraction or enrichment (i.e. 'purification' or physical separation) of cells or cell clusters from other material in the hydrothermally processed and homogenised mixture is beneficial to achieve a reproducible and uniform product consisting of isolated cells or cell aggregates/clusters. This has the further advantage of exclusion of free accessible starch (i.e. which has the potential to be highly glycaemic) and/or excess extracellular water (i.e. which can cause problems with microbiological safety if not removed).

When the extraction or enrichment comprises sieving, the step provides the advantage of allowing separation of the cells without damaging the cell wall integrity and to remove non cellular material so giving consistent/uniform product.

In one embodiment extraction or enrichment comprises passing the mixture through only one sieve with a specified aperture.

The recovered material is suitably retained on a sieve with an aperture greater than or equal to 20 μm. This delivers the benefit of exclusion of free starch granules and retention of cellular material.

More suitably extraction or enrichment comprises passing the mixture through a sequence of at least 2 sieves (i.e., from large to small aperture), such that the material retained on the sieve with the smallest aperture can be recovered and used in the next step(s) of the process. Suitably this extraction or enrichment step helps to create a uniform product with reproducible characteristics (e.g. particle size).

Use of a 2-sieve approach can streamline the process by placing less pressure on the single sieve, for example using a 2-sieve approach can allow removal of coarse material with the first or larger-aperture sieve and retention on the second or smaller-aperture sieve. This has the advantage of avoiding blocking of the smaller aperture sieve. This has the advantage of limiting the maximum size of the particles. This has the advantage of further enriching the single cells or cell clusters by removing larger debris. In this embodiment suitably the second or smaller-aperture sieve has an aperture greater than or equal to 20 μm.

Rinsing the homogenised mixture through sieve(s) with larger apertures is desirable. For example, to produce a product enriched for, or consisting of, cell clusters it is desirable to use sieves with apertures between 200 μm and 4 mm to select the desired cell cluster size-range before rinsing the material over the smaller sieve (i.e. a first sieve of aperture 4 mm and a second sieve of aperture 200 μm, retaining material between 200 μm-4 mm).

Alternatively, to produce a product consisting only of individual cells, it is desirable to pass the mixture through sieves with apertures between 80-250 μm (i.e. a first sieve of aperture 250 μm and a second sieve of aperture 80 μm, retaining material between 80-250 μm).

Drying

The next step is suitably drying. The extracted or enriched material (e.g. sieved material for example the material retained between the first (e.g. upper) and second (e.g. lower) sieves is then spread across a surface such as a flat surface to create a thin layer ('thin' means for example less than 0.5 cm in depth/thickness) and then subjected to a gentle drying process (for example at temperatures between 80 and 200° C. in a deck oven, or more suitably left to air dry under atmospheric conditions for 3 days).

Drying of the enriched/extracted material (such as sieved material) is beneficial to form a dry powder, which is advantageous over a wet material because it is stable upon storage and more versatile for use as a food ingredient, for example serving as a flour substitute.

Drying is suitably achieved by exposing the wet enriched/extracted material (e.g. from the sieving (i.e. sieved material)) to temperatures between 80 and 200° C.

Suitably drying is carried out for a period until the moisture content of the material is <10% of the material weight.

Suitably this involves spreading the material to a thin layer <0.5 cm and drying in a deck oven or leaving to air dry to achieve a material containing <10% moisture, more suitably <5% moisture.

Alternative drying method(s) may be used to achieve these results. For example, freeze-drying may be used. Freeze drying is not normally used to make conventional prior art commercial flour.

Suitably drying is carried out in a single chamber.

Suitably material is not passed through a nozzle, in particular during drying.

Suitably the drying is carried out in a temperature controlled chamber.

Suitably the material is heated to above ambient temperature. Ambient temperature means 22° C.

Suitably drying is by roller drying. This has the advantage of providing product with advantageous characteristics as described herein. Example 10 describes an exemplary drying step. Roller drying provides a commercial advantage compared to other methods e.g. deck oven. Suitably a roller dryer is used for the drying step.

Suitably roller drying is performed by loading the material onto a double-drum roller.

Suitably the dimensions of each drum are length=30 mm, radius=150 mm.

Suitably the gap between drums is larger than the desired particle size, suitably larger than the size of intact cell(s) or cluster(s). More suitably a 250 μm separation gap is used.

Suitably a nip to blade angle 180° is used.

Suitably a rotation speed 2.62 rpm (23 s/revolution) is used.

Suitably the steam pressure is set so that the paste does not boil at the nip. More suitably steam pressure 1 bar over atmospheric is used.

Optionally greater efficiency is likely to be achieved, for example, with higher pressure and faster roller speed.

Alternative drying methods which work in the invention include one or more of air drying, forced air oven drying, deck oven drying.

Alternative drying methods that can be used include one or more of belt-drying, continuous conveyor dryer, sun drying.

Alternative drying methods that may be used include freeze drying.

Atmosphere/Pressure

Suitably drying is carried out at a single pressure.

Optionally the pressure, such as the pressure in the drying chamber, may be reduced.

Further Options for Drying

Suitably the air or gas pressure in the chamber can be reduced to below ambient pressure. Ambient pressure varies according to factors such as location and/or weather. Ambient pressure may be taken to be 100 kPa.

Suitably the pressure can be reduced to below 14.5 psi. Preferably the pressure in the drying chamber and/or drying step is constant for the period of time required for the product to be dry (suitably 'dry' means less than 10% moisture).

In one embodiment air and/or gas convection is used to facilitate drying. Suitably air or gas movement is induced to facilitate mass transfer or drying. The skilled person will understand that although slight variations in pressure occur during convection and/or air or gas movement, the drying step is suitably conducted at a constant pressure.

Suitably the drying step may comprise one or more of drum drying, freeze drying, air drying, belt drying, oven drying and/or dielectric drying (radiofrequency assisted drying), or a combination of these.

Suitably the drying step is conducted in a single chamber, which embodiment therefore does not include spray drying.

Suitably if a drum drying step is used the single chamber is rotated.

Suitably if a freeze drying step is used the pressure in the chamber can be controlled and/or selectively reduced.

Suitably if belt drying is used a conveyor or driven belt means is located inside and/or passing through at least part of the drying chamber.

Suitably if dielectric drying is used radiofrequency (RF) and/or microwave is directed to the product inside the chamber.

Drying may be by air drying, oven drying, freeze drying or vacuum drying.

Drying Rate

Suitably slow drying is used. Most suitably a 50% reduction in moisture content is achieved over a period of min-30 hours.

Factors affecting the drying rate will vary slightly depending upon the type of drying system used:

1. nature of the material: physical and chemical composition, moisture content;
2. size, shape, and arrangement of the pieces to be dried;
3. wet-bulb depression (t-twb), or relative humidity, or partial pressure of water vapour in the air (all are related and indicate the amount of moisture already in the air);
4. air temperature; and
5. air velocity (drying rate is approximately proportional to $u^{0.8}$).

Case hardening is also a factor.

An exemplary drying step (e.g. step (e)) comprises spreading the material (such as chickpea material) onto sheet(s) so that the thickness is not in excess of 1 cm and drying in a forced air oven at 80° C., with mixing and re-distribution every hour, until moisture content of 10±2% is reached.

Further Considerations of the Process

The recovery (i.e. yield) of dry cell powder from the process of the invention may depend on a number of factors including processing parameters (including particular brand of instrument used e.g. for the blending/homogenisation etc) and/or the botanical source (i.e. starting material), but we have shown recovery of at least 40% of the original dry weight as cell powder when processing pulses.

It is an advantage that the process is scalable. The inventors tested each of the processing steps whilst maintaining resistant starch levels.

It is an advantage that the process minimises microbial issues. Without wishing to be bound by theory, it is believed that maintaining the intact cell structure may improve the anti-microbial properties of the product. In support of this, low levels of microbial growth have been observed despite prolonged storage in conditions that would normally encourage microbial growth.

Optional Additional Process Steps

Optional Cooling Step

The process may include an optional cooling step after the hydrothermal treatment (or after homogenisation or after sieving but in all cases always before drying). Most suitably cooling is immediately after hydrothermal treatment. This has the advantage of encouraging starch retrogradation. Starch retrogradation occurs during cooling, which can be advantageous. For example, starch retrogradation can be important for prebiotic effects on colonic microbiota. Moreover, retrograded starch is less susceptible to hydrolysis by α-amylase (i.e. increased resistant starch).

Suitably the cooling process comprises cooling the mixture to a temperature between 0 and 20° C.

Suitably said cooling is for a period between 30 min and 60 h. Suitably said cooling is for a period between 30 min and 24 h. This has the benefit of achieving slow-cooling and recrystallization, i.e. retrogradation, of the starch.

Optional De-Aggregation and/or Dry Sieving Step(s)

De-aggregation and/or Dry sieving step(s) are optional but beneficial because they deliver the ingredient in a commercially advantageous format (e.g., dry powder of uniform appearance and/or with known particle size distribution).

De-Aggregation Treatment

Suitably optional de-aggregation (if used) is carried out after drying, most suitably immediately after drying.

For the preparation of product containing individual cells, de-aggregation (i.e. the removal of aggregates) is desirable, as it has the advantage of breaking up any weak intercellular adhesions that may have been formed during the drying process.

De-aggregation suitably comprises applying low shear force for a period less than 10 min. This may be performed by grinding, blending, milling, and/or agitation (for example, using a vibratory separator) to achieve a powder whereby suitably >90% passes through a sieve of 50 μm, but is retained on a sieve ≥20 μm.

Examples of milling devices include an ultra turrax or roller mill.

Practical settings used in such de-aggregating treatments will be chosen by the skilled worker, because they will depend on the equipment used and the input materials. Typically there are many options that will work. It is conventional to specify the particle output size range, and the skilled operator may choose the settings on their particular equipment to obtain that size range as is routine in the art. For example, if the skilled operator puts in a larger amount of sample, they may need to grind it for longer or at a different force/speed to achieve the same size range. These choices are within the ambit of the skilled worker.

De-aggregation is suitably not used if a product containing cell clusters and/or larger particle size is desired.

Dry Sieving Treatment

It is an advantage to subject the dried product to a dry-sieving regime, which has the benefit of selecting for a chosen particle size range. This is especially helpful if the skilled operator has desired product specifications.

Dry sieving may be carried out after drying. In one embodiment dry sieving is carried out immediately after drying.

Dry sieving may be carried out after optional de-aggregation. In one embodiment dry sieving is carried out immediately after optional de-aggregation.

Suitably dry sieving comprises using a sieve, or a sequence of sieves such as two or more sieves, between 20 μm and 4 mm. The exact combination of sieves used depends on the operator's product requirements (i.e. with regard to particle size range).

Attention must be paid to the plant material since different species may have different cell sizes, and therefore may require different sieve apertures.

For example, to achieve a product containing cell clusters from chickpeas, material between 250 and 500 μm may be selected.

| Plant material | Particle/sieve size for single cells | Particle/sieve size for cell clusters |
|---|---|---|
| *Cicer arietinum* (chickpea, or 'garbanzo bean') *Phaseolus lunatus* ('butter | between 65 and 250 μm; suitably 65-249 μm; more suitably between 75 and | between 250 and 500 μm; most suitably 250-500 μm |

-continued

| Plant material | Particle/sieve size for single cells | Particle/sieve size for cell clusters |
|---|---|---|
| bean, lima bean or sieva bean')<br>*Lens culinaris* ('lentils')<br>*Pisum sativum* ('pea')<br>*Phaseolus vulgaris* ('field bean, flageolet bean, French bean, garden bean, green bean, haricot bean' | 250 μm; most suitably 75-249 μm | |

Combination of Optional Steps

As will be apparent, the skilled worker may choose one or more of the optional steps described depending on the characteristics of the product they wish to obtain.

An optional de-aggregation step is described: the dry material is optionally crushed or blended to a powder. Furthermore the dry material (whether or not the dry material is optionally crushed or blended) can optionally be subsequently be sieved to the desired size (for instance selecting chickpea material between 75 and 250 μm to obtain single cells; for instance selecting coarser material between 250 and 500 μm to obtain cell clusters), thereby creating a stable and uniform dry powder product.

By performing both of these optional steps (i.e. de-aggregation followed by sieving of dry material), advantageously the yield of the product of the desired size distribution is maximised.

Applications

The invention may be advantageously applied to all dicotyledonous plants ('dicots'). Suitably the invention is not applied to cereals (monocotyledonous plants ('monocots')). Suitably the invention is applied to legumes. Legumes are dicots.

For convenience, many of the examples herein, and the description of the invention, have been presented using chickpeas (a pulse seed). However, the process can also be applied to a broad range of pulses or other plant materials. For example, FIG. 4 shows that the invention applies to legumes other than chickpeas, such as pulses, therefore the invention is NOT limited to chickpeas but has a wider application as described herein. In other words, FIG. 4 shows that the process can be applied to other materials (incl. lentils, peas, beans) and that the product obtained has resistant starch levels similar to those obtained with chickpea. Therefore this confirms that the invention does indeed apply more broadly and is not limited to chickpeas Thus, starting materials that the process of the invention may be applied to include plant materials such as pulses (particularly chickpeas) but can also include pseudo-cereals (e.g., amaranth, quinoa, buckwheat) and other dicots or non-commelinoid monocots with Type 1 primary plant cell walls (e.g. see Waldron et al., 2003 (Waldron K W, Parker M L & Smith A C (2003) Plant cell walls and food quality. Compr Rev Food Sci Food Saf 2, 101-119)).

The inventors have noted that pseudo-cereals such as quinoa may be delicate and the cells may rupture more easily, thus suitably the plant material is not a pseudo-cereal; suitably the plant material is not amaranth; suitably the plant material is not quinoa; suitably the plant material is not buckwheat.

In more detail, fruit and vegetables have either Type 1 or Type 2 primary plant cell walls. The invention can be applied to any fruits and vegetables with pectin-rich Type 1 primary cell walls. Suitably the invention is NOT applied to plant species with Type 2 primary cell walls. By this definition, the invention may be applied to various tubers (including potato) and can certainly be applied to pulses (e.g. Faba, cowpea, pigeon pea, soybean, lentils etc), especially chickpeas, and all varieties of chickpeas. The cereals (Gramineae or Poaceae) have Type 2 primary cell walls (i.e. with little pectin, but characterised as having arabinoxylans and mixed-linkage beta-glucans as the major hemicelluloses) and therefore the invention does not apply to these cereals.

Cell wall classification is well known to the person skilled in the art, but in case any guidance is needed we refer to Brett C T, Waldron K W. 'Physiology and biochemistry of plant cell walls.' 2nd ed. London: Chapman Hall, 1996.

The plant material used in/by the invention is not restricted to chickpea, but is expressly taught to be varied. For example the inventors have tested that the process works for the following plant materials, i.e. that product as described above can be prepared wherein the plant material comprises cultivar(s)/varietie(s) of at least one or more of the following species:

*Cicer arietinum*

*Pisum sativum*

*Phaseolus lunatus*

*Phaseolus vulgaris*

*Lens culinaris*

Moreover the inventors expressly teach that the process may be used for the following plant materials, i.e. that product as described above may be prepared wherein the plant material comprises cultivar(s)/varietie(s) of at least one or more of the following species:

Faba beans (*Vicia faba*),

Pigeon pea (*Cajanus cajan*)

Mung bean (*Vigna radiata*)

Cowpea (*Vigna unguiculata*)

Other species within the *Phaseolus* genus

Potato (*Solanum tuberosum*, for example cv. Charlotte)

Without wishing to be bound by theory, these species are suitable because they are closely related species to those exemplified herein, and/or the inventors have observed indicative properties (e.g. cell separation on processing) for these species.

Suitably the plant material is, or comprises, chickpea (*Cicer arietinum*).

More suitably the plant material consists essentially of chickpea (*Cicer arietinum*).

Most suitably the plant material consists of chickpea (*Cicer arietinum*).

Suitably the chickpea is Russian cv.

Suitably the chickpeas are as from Poortman Ltd, London, UK.

Suitably the plant material is, or comprises, seeds, roots, stems or fruit, more suitably seeds or fruit, most suitably seeds.

More suitably the plant material consists essentially of seeds, roots, stems or fruit, more suitably seeds or fruit, most suitably seeds.

Most suitably the plant material consists of seeds, roots, stems or fruit, more suitably seeds or fruit, most suitably seeds.

'Stems' may include underground stems such as tubers.

It is an advantage of the present invention that an early step in the process, or more suitably a first step in the process, is the hydrothermal treatment, such as heat treatment, which leads to a simpler and more efficient process.

Considering Tosh et al. 2013 (Foods Vol. 2, pages 338 to 349), this discloses nutritional profile and carbohydrate characterisation of spray dried lentil, pea and chickpea ingredients. However, the product achieved in this document is only approximately 5% resistant starch. This is no better than ordinary flour which can contain approximately 1 to 5% resistant starch. Without wishing to be bound by theory, it is believed that Tosh's approach teaching spray drying of the material can make the cells porous and/or disrupt the cells so that they are no longer intact. This is a drawback of prior art approaches such as disclosed in Tosh et al. 2013.

It should be noted that Tosh et al do not teach any enrichment/extraction carried out on the wet homogenised material. An advantage of the method of the invention is that the extraction/enrichment of cells or cell clusters is carried out on the wet homogenised material. The technical benefit of this is to increase the proportion of intact cells or cell clusters. This also has the benefit of increasing the resistant starch in the final product. These advantages are neither taught nor suggested in Tosh et al.

The inventors believe that, amongst other things, the drying method used in Tosh et al is responsible for giving a product with inferior ingredient characteristics (e.g. inferior Resistant Starch content). The inventors also believe that the level of detail in Tosh et al is inadequate (i.e. a technical expert cannot use this reproduce their drying method).

The process of the invention uses drying method(s) that preserve ingredient resistant properties (preserve resistant starch content). The Tosh et al. 2013 method of spray drying does not preserve resistant properties.

The process of the invention uses water in the hydrothermal processing step. The Tosh et al. 2013 method uses steam.

The Tosh et al. 2013 legume samples generally, and in particular the chickpea powder in Tosh et al, have very low resistant starch contents. The product (such as cell powder product) of the invention has the advantage of significantly higher resistant starch content. Tosh et al. 2013 states at page 339 section 2.1:

> "Raw Kabuli chickpeas and green peas were soaked in water for 12 h at 4° C. Large green Laird lentils were immersed in water and immediately processed. All wash and cooking water was retained and further processed. The chickpeas, lentils and green peas were then cooked in a 520-L steam cooking double-walled tank for 60, 30-45 and 90-105 min, respectively. They were mixed and homogenized (Urschel cutter and Microcut Stephan homogenizer) and then preheated in a vertical tubular heat exchanger (30-40° C.). The homogenized preheated material was then dried in a fast-spouted bed dryer with 4-mm spherical Teflon beads acting as inert intermediate drying medium to intensify the drying rate, thus reduce the dryer volume. The use of inert particles permits control of moisture content and size distribution of dried pulses. Inlet air temperature was varied from 180 to 195° C." (emphasis added)

Examples of key differences compared to the invention (highlighted in bold) include heating methods (hydrothermal processing in aqueous medium such as boiling in excess water versus steam cooking in Tosh et al); temperature range and final drying method (air drying or oven drying according to the invention versus spray-drying at high temperature in Tosh et al).

Different heating methods can influence the physical and chemical quality of the dried product, and spray drying of some products as in Tosh et al can increase their surface area, which can disrupt the digestive-resistant properties of the product. The invention overcomes this drawback.

The Tosh process uses steam cooking, our process suitably does not. The inventors believe that steam cooking either does not enable cell separation, and/or damages cell wall integrity in some way. The invention's hydrothermal treatment (such as boil cook) overcomes this drawback.

Further differences from Tosh et al 2013 are indicated below:

| Process/Step | Tosh et al 2013 | Invention: exemplary feature(s) absent from Tosh |
|---|---|---|
| SOAK | 12 h at 4° C. | Overnight 4-30° C.; overnight at ambient (22 ± 2° C.); optional. |
| Hydrothermal Processing | Steam 30-105 min (temp and pressure not specified) | Aqueous medium at 75-105° C. |
| Homogenising | Urschel cutter and Microcut Stephan homogenizer | exemplary: blender or ultraturrax dispersing instrument |
| processing to enrich for cells/cell clusters (exemplary step: sieving) | NONE | Suitably the size range is 200 μm to 4 mm, and/or other size ranges for various advantages as explained herein. |
| Drying step | Spray drying: Preheated in vertical tubular heat exchanger (30-40 degrees) then dried in fast-spouted bed dryer with 4-mm | Drying in a single chamber (and therefore NOT spray drying) for example by convection. Oven drying |

-continued

| Process/Step | Tosh et al 2013 | Invention: exemplary feature(s) absent from Tosh |
|---|---|---|
| | spherical Teflon beads and inlet air temp 180-195° C. to achieve moisture content of 2.3-6.5%. | Freeze-drying NOT fast-spouted bed dryer. To achieve a moisture content of <10% or more suitably <5% |
| De-aggregation | "Powdered pulses were screened, sequentially, through 500 and 280 μm sieves only" | Optional <500 μm, but retained on a ≥20 μm sieve |
| storage | Under vacuum at 4° C. | Ambient at 22 ± 2° C. |

Regarding the product, the very low resistant starch (RS) values reported by Tosh et al (2013) of only 4.44% demonstrate that there may have been a high proportion of free starch (gelatinised) due to severe cell wall damage as a result of the heating and drying regime used in this prior art method. By contrast, the product of the present invention has significantly higher RS levels, which is an advantage over the prior art.

The order of steps in the process of the invention is critical to obtaining the technical benefits in the product. For example, hydrating and then hydrothermal processing then homogenising helps to separate the cells very effectively. This is a clear difference to the known methods. Known methods with other step orders increase fracturing due to not weakening intra-cellular adhesion first.

Re: Step (d)—processing to enrich for cells and/or cell clusters:

Suitably step (d) comprises wet-sieving.

Wet-sieving is defined moisture content of material being wet-sieved is 50% moisture or more. Most suitably wet sieving requires water to be added to the process, and it should be noted that dry sieving does not involve adding water.

Dry sieving vs. wet sieving has different effects on the material and these cannot be used interchangeably in the methods of the invention.

One reason for this is that inter-cellular adhesion forces and fracture mechanism of a dry material is different from a wet-material. In our wet-material, the intercellular adhesions have weakened such that applying agitation/force will lead to a high probability of cell-separation, whereas if the same force was applied to dry homogenised pulses, then the cells would be more likely to fracture across the intracellular matrix.

The order of the steps in the process of the invention is different to known methods. The order of steps is of critical importance to produce the product of the invention. Tosh et al did not wet-sieve the homogenised material. Wet-sieving is defined as the process of sieving wet material (>50% moisture (i.e. commonly measured to be ~60-70% bound water (moisture), and allowing ±10% error)) through sieves, (with the optional addition of water to aid sieving and cell separation). This is different from dry-sieving, which is defined as sieving a dry material (<10% moisture when used by Tosh et al) strictly without the addition of water.

Suitably the material which is wet-sieved is 50% or more water (moisture).

Suitably the material which is wet-sieved is at least 50% water (moisture).

Suitably the material which is wet-sieved is >50% water (moisture).

Suitably the material which is wet-sieved is 65-75% water (moisture).

Suitably the material which is wet-sieved is saturated with water (moisture). Suitably saturated means that the material will not take up any more water (moisture).

Suitably the water (moisture) content is adjusted to the desired value at or before the wet-sieving step.

Tosh et al does not disclose any wet sieving step.

Suitably hydrothermal processing is carried out in aqueous medium. Tosh et al did not use aqueous medium for hydrothermal processing.

Suitably drying is performed in a single chamber. Tosh et al did not perform drying in a single chamber.

Suitably drying is by convection drying. Tosh has not used convection drying, but instead has used spray drying: spray drying involves spraying a product through some form of nozzle. To the best of the inventors' knowledge, none of the other drying techniques mentioned herein involve a nozzle. Spray drying uses a pressure differential used to spray. Although there is a pressure differential involved in freeze drying to sublimate the frozen water (and arguably any drying technique involving convection has some pressure differential), spray drying involves two chambers/areas, the wet or pre-dried side of which must be at a higher pressure than the spray dried side.

By contrast suitably the material of the invention is dried at constant pressure, such as constant average pressure.

Tosh et al assert that cell walls are intact at page 344 under the heading "microscopy"/FIG. 2 of Tosh. However, the inventors assert that spray drying is a technique which is known to increase the porosity and reduce the bulk density of materials (ref. Bonaui et al 1996 Food Drying and Dewatering, Drying Technology, 14:9, 2135-2170). The resulting pores in the plant cell wall would not be visible on the light micrographs that Tosh has presented, and therefore Tosh will not know that they are present. The very low RS content of the Tosh materials relative to the product of the invention, based on the data presented by Tosh, can only be explained by the presence of such pores, which provide greater susceptibility to amylase penetration, versus the product of the invention which is largely (e.g. >90%) covered by a fibrous and impenetrable cell wall (see FIG. 8 for SEM observation of product of the invention). FIG. 8 shows a Scanning Electron Micrograph of a typical intact cell present in the product of the invention. Note that the cell wall is continuous and that the material is not porous.

The RS content in the Tosh et al product (<52%) is completely different from the product of the invention (>30% RS).

Similarly, Oyman (2007 PhD thesis) describes the separation of cells from marrowfat peas using NaHCO3 followed by heat treatment at 70° C. for 90 min, and subsequent sieving through series of sieves of 1 mm, 450 μm and 250 μm, to retrieve the wet filtrate, which was diluted in distilled water (100-250 g wet paste/L) and spray dried using a jet of hot air at 150° C. The thesis contains numerous images depicting intact cells, and the intact cell powders were digested at a slower rate than ruptured 'crushed' cells. However, the rate and extent of digestion of starch of these intact cell powders was significantly higher than the cell material we produce; for example, after 90 min the amount of starch digested in Oyman's cell powders were twice as high as the materials we produce. Thus, Oyman reports that at 60 min, 72% of the starch was digested from intact cells, and 91% from broken cells, whereas at 90 min, 83% of starch was digested from intact cells compared with 91% starch digested from crushed cells. Accordingly, the difference in resistant starch between Oyman's cell powders and broken cells (i.e. flour) will be negligible. In contrast, we show <40% starch digested at 90 min. In contrast, our process requires hydrothermal treatment at 75 to 105° C. In contrast, our process requires separation of cells after hydrothermal treatment. Indeed, in FIG. 1 of WO2007/0006383 (which corresponds to the Oyman method), the difference between intact and crushed cells is minimal, compared with our data (see FIG. 3—discussed in the examples section below) which shows significant benefits according to the present invention.

The Tosh 2013 method is based on rapid drying, which the inventors believe is detrimental to cell wall integrity. Spray drying in Tosh 2013 is an example of rapid drying. The inventors teach that drying rate and/or method of heat delivery is important. In other words, it is not only temperature of drying but rate of drying and drying method—spray drying as in Tosh is detrimental to cell wall integrity. Without wishing to be bound by theory, this may be because the force with which the hot air circulation is applied for spray drying may create pores in the cell wall. Whatever the precise mechanism, the drawback in the prior art can be seen in the results from Unilever's WO2007/006383 and Tosh 2013 showing the very low level of resistant starch and relatively high digestion rates/extent. In contrast, most suitably 'slow' drying methods taught herein avoid this disadvantage. An exemplary 'slow' drying means a 50% reduction in moisture content is achieved over a period of min-30 hours. (In contrast, rapid drying such as spray drying occurs within a fraction of a second to a few seconds.)

In more detail, the inventors assert that what Tosh et al have described is NOT a "spray-drying" method at all. In other words, Tosh et al have used the wrong terminology to describe their drying method. What Tosh et al have used (see page 339) is a different technology, namely "a fast-spouted bed dryer". This method also included "4-mm Teflon beads" to help intensify the drying rate. No description of a conventional spray drying method was included. The present invention teaches the use of 'low intensity' drying methods rather than the 'high intensity' drying techniques and this departure from the prior art has led to a higher quality product. Thus suitably the process of the invention does not include fast-spouted bed drying. Suitably drying the material of the invention is by a method other than fast-spouted bed drying. Suitably fast-spouted bed drying is specifically excluded from the methods of the invention. Suitably the material of the invention is dried by any method avoiding fast-spouted bed drying.

Thus, in some embodiments, the invention teaches specific procedures for drying of the material. Suitably the process of the invention does not include spray drying. Suitably drying the material of the invention is by a method other than spray drying. Suitably spray drying is specifically excluded from the methods of the invention. Suitably the material of the invention is dried by any method avoiding spray drying.

Suitable techniques for drying the material of the invention include oven drying, air drying, drum drying, belt drying or freeze drying.

Considering Unilever's WO2007/006383, the Unilever process indicates that homogenisation (when used) is performed before heating (see page 8 lines 12-13 et seq). In contrast, it is essential in the process of the invention that the homogenization is performed after heating. This order of steps is scientifically important because the Unilever step of homogenising before the intercellular adhesions have been weakened is known to result in a high degree of cell rupture relative to the method of the invention. In contrast, by carrying out the hydrothermal treatment before homogenisation according to the present invention, cell rupture is dramatically reduced or avoided. Thus, using the prior art process of WO2007/006383 does not lead to the production of a product containing high amounts of resistant starch (e.g. encapsulated starch).

Heating conditions: The heating step in the method of WO2007/006383 is performed at a lower temperature than the process of the invention (i.e. 50-75° C. in WO2007/006383 compared with our hydrothermal treatment (such as boiling treatment or our preferred treatment of 75-105° C. or most preferred treatment of 76-105° C.)). This is scientifically important because cell-separation is not successful/optimal at temperatures between 50 and 75° C.; use of such low temperatures requires the use of chemical agents (e.g., EDTA, Na2CO3, NaHCO3, enzymes etc.) in the prior art method. Suitably chemical agents are not used in the methods of the invention. Suitably the medium for hydrothermal processing in the invention is water only.

In contrast, the method of the invention has been specifically designed to achieve a very high yield of individual isolated cells using only water as the aqueous medium. Boiling/higher temperatures are more effective at cell separation, which is caused by heat-catalysed depolymerisation of the pectic material bridging the middle lamella of the cell walls (i.e. reducing cell-cell adhesion). In addition, such high temperatures are beneficial for food safety reasons (e.g., inactivation of antinutritional factors and/or other potentially harmful substances). This important difference in processing temperature leads to a technical benefit in the product i.e. the 'controlled-release' properties of the product of the invention are superior to those of the prior art product.

Thus the invention provides the advantage of improved cell separation by choice of the particular hydrothermal processing conditions. Thus the invention provides the advantage of avoiding the use of chemical agents by choice of the particular hydrothermal processing conditions.

Ruptured Cells: the separation step in WO2007/006383 does not exclude ruptured cells: The cell separation (wet-sieving) step in the WO2007/006383 process does not include a step to exclude free starch and other debris from ruptured cells, i.e. evident because the lowest sieve aperture used is 250 μm, and there is no smaller sieve to exclude starch granules, damaged cells/cell fragments and other less desirable debris (i.e. which are typically <50 μm in size). This is scientifically important because it means that the prior art product contains broken cells with accessible starch (rapidly digestible and high glycaemic). This results in a prior art product with a higher glycaemic potency. Thus, the prior art product differs from the product obtained with our method, because we include a beneficial step of extracting or enriching cells and/or cell clusters from the physically disrupted material (for example by rinsing the material over a small aperture sieve before recovery) which has the benefit of excluding the broken cells from the product.

Drying Method: The WO2007/006383 method specifies that spray drying should be used to dry the material; however, the method of the invention uses a more gentle drying process. The invention advantageously avoids spray drying. This is a benefit because the inventors believe that spray drying damages cells by making them more porous.

Cooling Step: In order for starch retrogradation to occur, exposure to a cold environment (as taught as an optional step in the method of the invention) is required. Thus the inventors teach that actively cooling the material can further reduce its digestibility and/or alter its functional properties (such as thermal resistance). This teaching is absent from WO2007/006383.

Homogenisation/pulverisation tools: Using a pestle and mortar or a blender for homogenisation will result in a similar material. Comparison between these mechanical tools within the method of the invention shows no effect on the endpoint product characteristics and therefore these embodiments are equivalent. However, it remains important that the nature of the material being homogenised is as taught herein (i.e. hydrothermally processed).

Product

Suitably the product is derived from plant tissue.

Suitably the product comprises intact plant cells.

Suitably the product comprises 15% or less water.

Suitably the product comprises at least 30% resistant starch, preferably at least 50% resistant starch, preferably at least 55% resistant starch, preferably at least 60% resistant starch, preferably at least 80% resistant starch, as a proportion of total starch.

Suitably the product comprises 30% resistant starch, preferably 50% resistant starch, preferably 55% resistant starch, preferably 60% resistant starch, preferably 80% resistant starch, as a proportion of total starch.

Suitably the product is a powder.

Suitably the product is a food product.

Suitably the product is a food ingredient.

Suitably the product is a nutraceutical.

Suitably the product comprises a particle size in the range 75-500 μm, more suitably 75-250 μm, more suitably 75-249 μm.

More suitably the product comprises a particle size in the range 20-250 μm (e.g. intact cells from pulses), more suitably 50-250 μm (e.g. intact cells with no free starch granules), more suitably 80-150 μm (e.g. mainly intact cells with no free starch, and would also not contain larger individual cells that can give a gritty mouthfeel when included in some food products).

Suitably the product has a particle size distribution in which 95% of particles are within the range 20 μm to 4 mm.

Suitably the product has a particle size distribution in which 95% of particles are within the range 75-500 μm, more suitably 75-250 μm, more suitably 75-249 μm, more suitably 20-250 μm, more suitably 50-250 μm, more suitably 80-150 μm.

Suitably at least 60%, more suitably at least 80% of the starch in the product is contained within intact plant cells.

Suitably at least 30%, more suitably at least 50%, more suitably at least 60%, more suitably at least 70%, more suitably at least 80%, most suitably up to 90% of the starch is 'Resistant Starch' ('RS'), wherein 'Resistant Starch' is defined as starch that is not digested within 90 min incubation with pancreatic α-amylase (hydrolysis index). RS ('Resistant Starch') is usually expressed as a % of Total Starch, and it is useful to also express as RS g/100 g material, for example for chickpea; 25 g RS per 100 g powder (powder being the product as described herein).

Suitably the product consists of at least 30% by weight, more suitably at least 50% by weight, more suitably at least 64% by weight, intact individual starch-filled cells or clusters of intact starch-filled cells when viewed under a light microscope.

Some variation in the proportion of intact cells and/or in the amount of resistant starch and/or the particle size is expected. Variation may result from using different raw materials and/or can be varied by the operator depending on their choice of (for example) sieve apertures when carrying out the process.

Most suitably the product may be a coarser powder containing cell clusters, or may be a finer powder containing isolated cells. Most suitably each such product has 'ultra-low glycaemic potency' as described below.

Suitably the product is an ingredient such as a foodstuff ingredient.

The amount of starch digested at 90 min ('hydrolysis index' or 'C90') is a known and accepted predictor of the glycaemic response to a food in vivo (glycaemic index) (Goñi, I., Garcia-Alonso, A. & Saura-Calixto, F. (1997) A starch hydrolysis procedure to estimate glycemic index. Nutr Res 17, 427-437). Thus, discussion of 'glycaemic index' as used herein may refer to accepted definitions for high (GI≥70) medium (GI 56-69) or low (GI≤55) glycaemic ingredients.

It is an advantage of the invention that the products described are suitably low GI (C90≤55). More suitably the products of the invention are very low GI such as C90<45%—these have the benefit of an 'Ultra low glycaemic potency'.

Most suitably the products of the invention have C90 values in the range 20-40%.

Prior art products made from whole food materials (e.g., grains such as cereals or legumes) tend to contain between 1-6% resistant starch (e.g. Tosh et al. 2013 (ibid.)). For example, BarleyMax™, a product made from wholegrain barley rather than extracted components, only contains 3% RS.

Starch/Resistant Starch

There are several types of resistant starch. These are outlined below.

Type 1: starch encapsulated by cells or structures.

Type 2: raw/native starch.

Type 3: retrograded starch (for example boiled and then cooled—this promotes re-crystallisation of the starch).

Type 4: chemically modified—amylase resistant derivatives of starch can prepared, for example by action of phosphodiesterase on the starch, and/or crosslinking of the starch.

Type 5: amylose-lipid complexes—such complexes are not susceptible to the action of alpha-amylase.

These are described in more detail in the following table (table modified from Birt et al (2013) Adv. Nutr. 4: 587-601 (doi:10.3945/an.113.004325)):

| Types Of Resistant Starch | | |
|---|---|---|
| RS1 | Physically inaccessible starch e.g. intact cell walls of plant tissue as a barrier to amylolysis | Coarsely ground or whole-kernel grains (legumes and cereals), dense pasta matrix. |
| RS2 | Raw granular starch; B- or C-polymorph starches more resistant than A type | High-amylose maize starch, raw potato starch, raw green banana starch. |
| RS3 | Retrograded starch | Cooked and cooled starchy foods. |
| RS4 | Chemically modified starches | Cross-linked starch and octenyl succinate starch. |
| RS5 | Amylose-lipid complex | Stearic acid-complexed high-amylose starch. |

In more detail, Type 2 (raw starch) is mostly eaten in relatively small quantities in (mostly uncooked) foods; biscuits have starch that remains in a more native state (the starch granules are free since the wheat has been roller milled). Type 3 refers to starch that has been cooked and gelatinised and then cooled so that some of the original cooked starch forms retrograded starch that is less susceptible to amylase. Type 4 refers to starch which has been derivatised chemically (commercially) not by normal food processing. They have other properties and used as functional additives to improve texture of sauces etc. Type 5 is related to starch lipid interaction which may or may not occur during food processing.

Known (prior art) powders containing high Resistant Starch (RS) tend to be pure starches, for example Hi Maize (Ingredion) (56% RS), or Novellose, which reportedly contain around 40-56% Resistant Starch. Notably, this form of resistant starch is a different type to that found in our product, in that this commercial form and other types (some commercially available) are all intrinsically resistant (RS Types 2-5), whereas our product contains Type 1 RS encapsulated by cell walls; (i.e. structurally intact dietary fibre). Thus the cell wall encapsulation RS (Type 1) according to the present invention is measurably different to the other types, e.g. Hi-maize. For example Hi-maize and other prior art types have nothing to do with encapsulated starch (i.e. with intact cell walls or dietary fibre) as present in the product of the invention. Also, the RS in the product of the invention ('cell powder') is encapsulated by cell wall dietary fibre, which contributes to the enhanced nutritional properties; so the product has fibre and RS.

The inventors assert that the % intact cell and % RS(1) are proportional by definition. For example, in a product containing 100% intact cells, 100% of the starch is RS1. If it contains 50% intact cells, then 50% of the starch is RS1.

The products of the invention are different from products known in the art, as illustrated with data in Example 8.

Known products Novellose and Hi-Maize are both powders with moisture less than 16%, and particle size within the range 75-500 um. Novellose contains 47-60% RS, and Hi-Maize contains 42% RS.

However, known products Hi Maize and Novellose do not contain intact plant cells. Hi Maize and Novellose do not contain RS1. They are a different type of resistant starch (i.e. RS2 raw and RS3 vs. our material which is RS1 (encapsulated by intact cell walls)).

Hi Maize and Novellose differ in nutrient composition: These products are pure starches and would only contain small or trace amounts of non-starch polysaccharides, protein, and fat. "Trace" signifies that the constituent is present, but at a level that cannot be measured adequately. It may also be used when the level is judged to be nutritionally insignificant. Most suitably as used herein "trace amount" means <2 g per 100 g edible portion.

Exemplary composition (incl. dietary fibre, protein, fat) of our products (g/100 g) is provided in Table 1 herein. The 'dietary fibre' value includes non-starch polysaccharides=cell wall polysaccharides as mentioned in the table footnote.

The RS in an exemplary product of the invention, such as chickpea cell powder, is mostly RS1, since as reported by Edwards et al 2015 (Food Funct., 2015, 6, 3634) much of the starch is encapsulated by cell walls (structurally intact dietary fibre) and is physically inaccessible. However, some starch may have similar properties to RS2, since birefringent starch granules were observed by Edwards et al 2015 (ibid.). Encapsulated starch granules in intact cells are less gelatinised due to restricted swelling and are therefore less susceptible to amylolysis, which is an advantage of the invention.

Edwards et al 2015 (ibid.) does not disclose cell powders of the invention and does not disclose the method of the invention. No such products are mentioned and no such powders were prepared. The experiments in this prior art publication were designed to look at gelatinisation of whole plant tissue (comparing wheat and chickpea). The CP tissue were whole and the cells were not separated. The starch was examined in situ by DSC and microscopy.

Without wishing to be bound by theory, some RS3 is likely to be present but this has not been measured, and indeed, current methods for measurement of resistant starch do not distinguish between these different resistant starch sub-types. For the avoidance of doubt, when 'resistant starch' (RS) is discussed herein, suitably this refers to RS as measured using the protocol provided below.

(100% total starch content)−(percentage digestible starch) =(resistant starch), where percentage resistant starch is measured according to the protocol provided (see below).

The evaluation of starch digestion in vitro using pancreatic α-amylase acting upon various starchy foods and extracted starches, based on principles of first-order enzyme kinetics, are routinely performed by many research workers. In vitro models of digestion allow predictions of starch digestion in vivo and also empirical estimates of the glycaemic index of foods (Goni et al., Nutr. Rev. 1997, 17, 427-439).

Unless otherwise apparent from the context, 'digestible starch' is defined as digestible starch assessed according to the method of Goni et al. 1997.

More suitably 'resistant starch' is defined as resistant starch (RS) assessed according to the following protocol:

Digestibility Assays

Purpose: Determine digestibility of starch-rich materials

Reagents:

Phosphate Buffered Saline (PBS),

In deionised water from Oxoid tablets as per manufacturer instructions

Stop solution 0.3M $Na2CO_3$:

6.36 g $Na2CO_3$ in 200 mL water

Amylase working solution

Usually by taking 10 µL stock supplied into 50 mL PBS (~100 nM amylase, where the stock contains between 40-60 kU/mL, in which 1 U is defined as the amount of amylase that will liberate 1 mg of maltose from gelatinised potato starch in 3 min at 22° C.

Method

1. Prepare 200 µl stop solution. into 12×4×1.5 mL tubes on ice
2. Weigh materials into 4×15 mL falcon tubes. The quantity of material added to each tube should be the amount needed to provide 30 mg starch.
3. Add 10 mL of PBS to each tube, label, and then mix on rotary mixer 37±2° C. for 10 min to equilibrate.
4. Take a 200 µl blank, then add 850 µl amylase working soln. to each tube with 30 s stagger, placing each tube in the rotary mixer before moving to the next.
5. Collect 200 µl aliquots into stop solution. at predetermined time points. Remove tube from mixer 20 s before each time point, and sample liquid from top of the tube.

| Sample | TUBE 1 | TUBE 2 | TUBE 3 | TUBE 4 |
|---|---|---|---|---|
| Blank(B) | −4 min | −3 min 30 | −3 min | −2 min 30 s |
| START- | 0 | 30 s | 1 min | 1 min 30 s |
| 1 | 3 | 3 min 30 s | 4 min | 4 min 30 s |
| 2 | 6 | 6 min 30 s | 7 min | 7 min 30 s |
| 3 | 9 | 9 min 30 s | 10 min | 10 min 30 s |
| 4 | 12 | 12 min 30 s | 13 min | 13 min 30 s |
| 5 | 15 | 15 min 30 s | 16 min | 16 min 30 s |
| 6 | 20 | 20 min 30 s | 21 min | 21 min 30 s |
| 7 | 25 | 25 min 30 s | 26 min | 26 min 30 s |
| 8 | 30 | 30 min 30 s | 31 min | 31 min 30 s |
| 9 | 45 | 45 min 30 s | 46 min | 46 min 30 s |
| 10 | 60 | 60 min 30 s | 61 min | 61 min 30 s |
| 11 | 90 | 90 min 30 s | 91 min | 91 min 30 s |

6. At the end of the assay, spin aliquots at 16,200× g for 5 min. Transfer 300 µl of resulting supernatant into new 1.5 mL tubes. Store at −20° C.

Prussian Blue Assay for Determination of Reducing Sugars

Purpose: Determine the concentration of reducing sugars

How does it work: The colour formation arises as a result of reduction of ferricyande ions by reducing sugars (e.g. products of starch amylolysis) in alkali solution (pH>10.5) at 100° C., which results in formation of ferric cyanide or 'Prussian blue' (Deng et al. 1994). The method used was adapted from (Slaughter et al. 2001; Slaughter et al. 2002). Other suitable methods for determining reducing sugar concentration include the PAHBAH assay (Edwards et al 2018, Food Chem, 244:386-393.)

SAFETY: Wear gloves, safety glasses and labcoat. Make up reagents in fume hood. Potassium Cyanide (KCN) is highly poisonous and toxic through skin absorption and ingestion! Sulfuric Acid ($H_2SO_4$) is corrosive.

Reagents:

Solution A (16 mM KCN, 0.19 M $Na_2CO_3$ in deioinised water) *highly poisonous*

Solution B (1.18 mM $K_3[Fe(CN)_6]$ in deionised water). Light sensitive; wrap in foil/use amber bottle.

Solution C (3.11 mM $NH_4Fe(SO_4)_2$, 0.1% (w/w) SDS and 0.2% (v/v) $H_2SO_4$ in deionised water). Prepare fresh. (1.18 gravity, use glass pipette). *corrosive*

Maltose 10 mM stock:

Maltose mono-hydrate in deionised water (store aliquots in freezer and thaw 1.5 for use)

Maltose 100 µM working solution: 50 µl of maltose stock into 5 mL deionised water.

Method:

7. Defrost samples and maltose standard from freezer in the drying cabinet for ~10 min
8. Pulse spin aliquots to 16,200× g, transfer to boiling tubes and dilute samples in deionised water to fall within working range of assay. Record the dilutions.
9. Use the maltose 'working solution' to prepare the maltose standards (Table 1.1).
10. Add 150 µl of solution A and 150 µl solution B to each tube, including the standards.
11. Vortex, then place in a floating device and boil in waterbath for 15 min, then take out to cool under fumehood for 10 min.
12. Add 750 µL Solution C to each tube, vortex mix, and transfer 240 µL of each mixture into wells on a 96-well plate. Agitate gently, and allow colour to develop for 30 min before reading Abs 640 nm in the FLUOSTAR OPTIMA.

TABLE 1.1

Standard Curve. Preparation from 100 µM maltose solution.

| # | Maltose Std (µL) | Deionised $H_2O$ (µL) | $[Maltose]_f$ µM |
|---|---|---|---|
| S0 | 0 | 500 | 0 |
| S1 | 100 | 400 | 20 |
| S2 | 200 | 300 | 40 |
| S3 | 300 | 200 | 60 |
| S4 | 400 | 100 | 80 |
| S5 | 500 | 0 | 100 |

Calculations or Determination of Resistant Starch from Digestibility Assay with Prussian Blue Assay Data:

1. Use the maltose standard curve (Beer Lambert law) to calculate the concentration of maltose in unknown test samples from the measured absorbance values (AU).
2. Multiply by the dilution factor to calculate the concentration of maltose in the undiluted samples (ensuring to taking into account all dilutions that have been made).
3. Calculate the initial concentration of starch in the tube at the start of the assay, assuming all starch is maltose: i.e. Starch mg/ml=maltose mg/ml=$M_i$mg/ml
4. For each time point (t) express the maltose concentration (C) as a percentage of starch digested: $C_t$ (% starch digested)=$C_t/M_i$*100, where $C_t$ and $M_i$ both have the same units.
5. Calculate the % of digestible (non-resistant) starch as the area under the starch hydrolysis curve as a percentage of the area under a highly digestible gelatinised starch standard, measured under the same conditions (Hydrolysis Index, HI). Or, if the experiment has been conditioned correctly, use the value of C at 90 min as the digestible starch %.
6. Calculate % resistant starch as 100−HI.

Most suitably % resistant starch is calculated as 100-HI. By way of explanation, the data is normalised to gelatinised starch standard, which is set at 100 and =80 after 90 min, i.e.

if value is 40% at 90 min, then this is equivalent to 50% resistant starch based on the RS90 method.

Considered from the perspective of improved resistant starch, the nearest prior art might be considered to be dry roasted whole peas. This product delivers a significant amount of resistant starch. However, this is not an ingredient product. This product has a different particle size to the product of the invention.

Considered from the point of view of powders, a nearest prior art might be a chemically modified starch. However, such a product has no intact cells (no cell wall material, the main source of dietary fibre). Therefore such chemically modified starch powders are not products according to the invention.

In the prior art there is a product known as "Barley-Max™". However, this comprises only 5% resistant starch. Moreover this product is in the form of flakes and therefore has a different particle size to the product of the invention. This product is made from barley.

A prior art foodstuff such as bean curd is known to comprise resistant starch. However, this is a wet product and so is not a product according to the invention. Bean curd has a percentage moisture content of greater than 15% water. Therefore, this product is not part of the invention.

Optional Cooling Step

In methods of the invention the heated material of step (b) may optionally be allowed to cool before going onto the next step (i.e. physical disruption of step (c)). This optional cooling step advantageously permits starch reorganisation in the material. By contrast, in the Tosh et al paper (ibid.) the cooked pulses were mixed/homogenized and then preheated before drying in a fast-spouted bed dryer so that the product temperature was never low for any significant time. Without wishing to be bound by theory, this lack of a cooling stage in the Tosh et al method may indicate significant differences in the starch reorganisation compared to our product, which may therefore also be part of the explanation why the Tosh product has such very low resistant starch content.

Further Applications

The product of the invention such as the cell powder/food ingredient may be incorporated into different food products. The skilled worker will need to pay attention to the resilience of the product (ingredient) to secondary processing treatments in order to handle it accordingly when incorporating into various target product categories (e.g. baked goods, extruded cereals, beverages, biscuits).

The product of the invention, such as chickpea product, finds utility in the conventional chickpea flour arena as a nutritionally-enhanced version of chickpea flour. The product finds application in the cereal market's ($41 bn) lucrative breakfast segment. In particular, there are opportunities in the breakfast biscuit segment (which is dominated by Belvita™) providing sustained energy, low glycaemic index and appetite suppression benefits, and/or in the cereal bar market (worth £425 m in the UK).

Other applications of the invention include smoothies, pasta and noodle products, infant nutrition, sports nutrition and higher protein products ($5.2 bn). Pea protein is already a significant product in this category and in the growing allergy/gluten free categories (£561 m UK Market). These benefits are aligned closely to meeting the growing global health challenges in the developed world, notably obesity and diabetes.

The process may be applied to diverse plant material (botanical material), such as fruit or vegetables, to obtain cellular material products with advantageous sensory properties and/or added nutritional benefits. For example, products according to the present invention may be obtained from fruits or vegetables or indeed their respective waste-streams, without compromising the functionality of their valuable polyphenolic compounds (e.g. some of which are 'antioxidants' and have other health benefits); these cell powder products might be used to deliver beneficial phytochemicals to the colon. This would not only serve as a valuable research tool for studies exploring the health beneficial effects of fruit and vegetable consumption, but in addition, or in the alternative, the incorporation of such cell powders into food products may provide a new means of boosting fruit and vegetable intakes by the general population.

Outside the field of nutrition and functional food, pulse powders could provide new and interesting textures for application in cosmetics. The fibre-rich cell powder materials of the invention may also serve as fermentation substrates. They also provide a valuable experimental tool for scientific research. For example, if the cells can be used as food ingredient 'vehicles' and loaded with substances, they may have potential use as delivery systems of biologically-active substances to the colon.

Further Advantages

The invention has the advantage that it delivers a dry ingredient with a surprisingly high level of intact cells (e.g. pulse cells) with an intact cell wall and thus reduced glycaemic potency. Furthermore, the wet processes described in the literature are only suitable for production of a small amount of cell paste material. The process described herein is scalable, this enabling the production of large quantities of a food grade (e.g. microbiologically approved) ingredient.

One limitation of many other nutraceuticals is that there are restrictions on the maximum dose that can be safely administered. It therefore proves difficult to achieve the required level of dietary inclusion that is needed to impact on health. One major benefit of the approach described herein is that we are modifying the behaviour of starch—a major dietary component which is already consumed in large quantities in a range of staple foods. Thus, the product of the invention, such as a nutraceutical, provides a unique opportunity to substantially reduce the glycaemic and caloric potency of the largest single source of calories in our diet. Thus the invention possesses the required industrial application.

Another advantage is that this invention broadens the scope for legume consumption by providing intact cells in a stable powder form, which can conveniently be incorporated into a broad range of food products (especially staple foods), for example in place of wheat flour or other flours, thus enhancing nutritional qualities (e.g. slow release energy).

We show the manufacture of the cell powder through a large scale food-grade process. Thus we teach that the product can be obtained through a scalable process. We show evidence which indicates that the product has nutritional benefits.

We demonstrate that the product is superior to prior art materials such as prior art flours.

BRIEF DESCRIPTION OF THE DRAWINGS

FIG. 1 shows diagrams to illustrate the effects of mastication or physical deformation of edible plant tissue on cell wall rupture (A) and cell wall separation (B) and the implications of intracellular macronutrient bioaccessibility (release).

FIG. 2 shows (A) photographs of chickpea flour prepared by milling of the dried seed and chickpea cell powder prepared by cell separation method described in this invention; (B) light microscopy images of separated chickpea cells; and (C) starch granules released from chickpea cells after rupturing the cell walls.

FIG. 3 shows starch digestion (%) over 90 min of cell powder materials from chickpeas and boiled chickpea flour and micrographs showing typical appearance of flour (A) and cell powder (B) after digestion.

FIG. 4 shows starch digestion (%) over 60 min, photographs of cell powders and polarised light microscopy images of intact cells of legume tissue. In particular the following species are shown: *Cicer arietinum, Pisum sativum, Phaseolus lunatus, Lens culinaris.*

FIG. 10 shows light micrographs of cell powder in baked bread crumb (A), crust (B). Bi-refringent starch is evident under polarised light (C) and intact cells containing RS1 (D) are clearly present after baking.

FIG. 11A shows a bar chart and graphs. In more detail, FIG. 11A shows a barchart of resistant starch (RS90) and starch digestibility curves of loaf bread in which increasing proportions (0 to 90%) of the wheat flour has been substituted with product according to the invention (in this example produced from chickpea).

FIG. 11B shows a bar chart and graphs. For more detail, see example 11.

FIG. 12 shows a barchart of the proportion of intact cells in cell powders obtained according to the present invention (in this example from chickpea).

Figure 5:
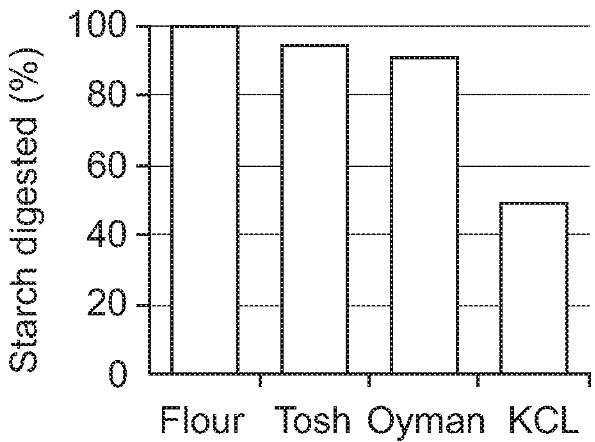
FIG. 5 shows a bar chart of starch digestion values after 90 min incubation (%) of chickpea flour and cell powders prepared by the invention ('KCL') compared with similar dried cell powders, including chickpea of the Tosh sample.
Figure 6:
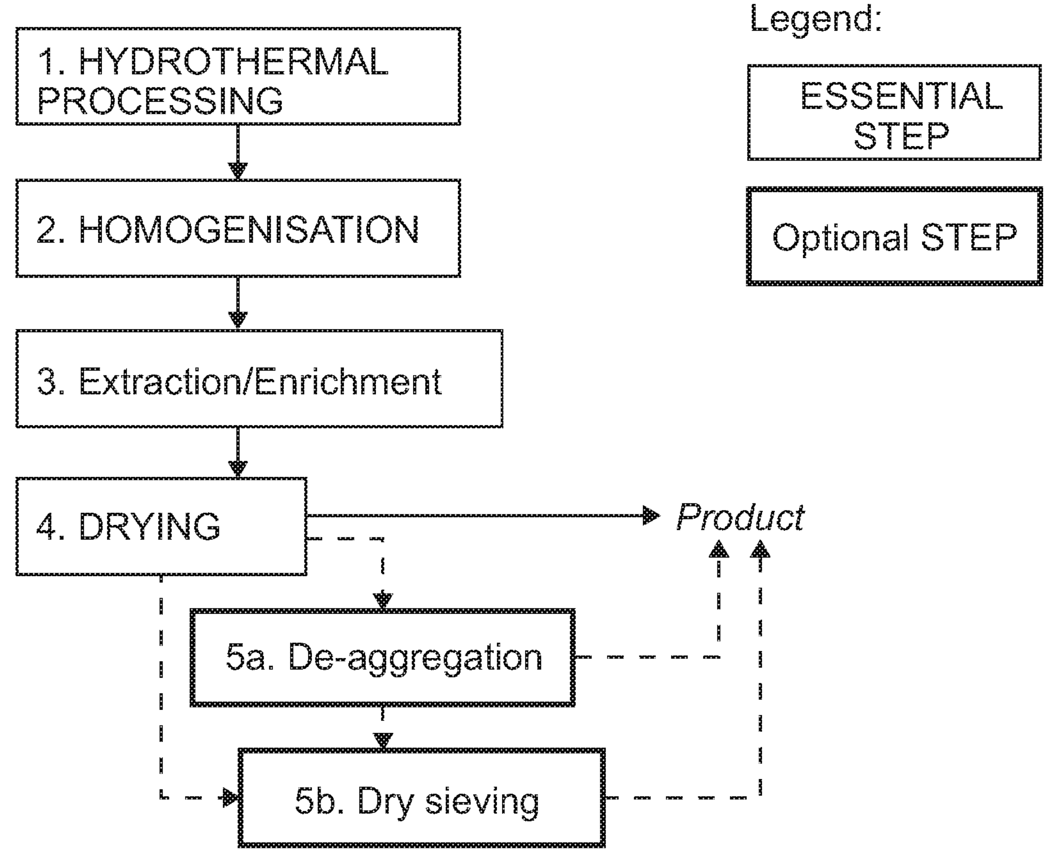
FIG. 6 shows a flow chart. N.B. 'extraction/enrichment' in FIG. 6 may mean separation of the cells or cell clusters from at least part of the homogenised mixture.

The invention is now described by way of examples. These examples are intended to be illustrative and not limiting on the scope of the invention, which is as defined by the claims.

Example 1—Product

The product obtained from the process described above is a stable and uniform, dry powder with a neutral flavour and odour, and similar appearance to flour but a slightly 'grittier' texture. Initially the powder has a colour tainted appearance (e.g. yellow for chickpea cell powders), however this pigmentation fades to an off-white colour during storage.

FIG. 2A shows an example of chickpea cell powder according to the invention (75-250 μm after 2 months storage) compared to conventional chickpea flour.

Microscopically, the powder consists predominantly of separated intact plant cells (at least 64% intact cells, n=2730 counts) with encapsulated pre/part-gelatinised (birefringent) starch (FIGS. 2B and C). The presence of birefringence indicates that the starch has retained a degree of ordered structure, characteristic of native starch.

The physical appearance (A) and microstructure of cell powders according to the invention (B) and conventional flour (C) viewed under polarised light to show birefringent starch (see FIG. 2).

Example 2—Nutrient Composition

The nutrient composition of the cell powder reflects its botanical source. The table below shows an example of data from conventional chickpea flour, cell powders of the invention and the original whole pulse plant material (i.e. seeds).

The moisture content of cell powders when stored is similar to conventional flour and typically between 8 and 14%.

The total starch content, measured directly, is typically between 45 and 65 g/100 g fresh weight.

TABLE 1

Overview of nutrient composition in whole chickpeas, de-hulled milled chickpea flour and a de-hulled chickpea cell powder, all prepared from the same batch of chickpeas.

| TEST | PLANT MATERIAL WHOLE CHICKPEAS | CONVENTIONAL CHICKPEA FLOUR | CHICKPEA CELL POWDER (INVENTION) |
|---|---|---|---|
| Energy (kJ/100 g) | 1366 ± 1.0 | 1408.3 ± 5.8 | 1409.7 ± 5.7 |
| Energy (kcal/100 g) | 325.7 ± 0.3 | 335.7 ± 1.5 | 334.3 ± 1.3 |
| Protein (g/100 g) | 21.7 ± 0.2 | 23.0 ± 0.0 | 21.1 ± 0.0 |
| Available Carbohydrate (g/100 g) | 35.8 ± 0.1 | 37.5 ± 0.6 | 50.0 ± 0.3 |
| Sugars (g/100 g) | 2.9 ± 0.0 | 3.0 ± 0.0 | 0.1 ± 0.0 |
| Starch (g/100 g) | 33.0 ± 0.1 | 34.6 ± 0.7 | 49.9 ± 0.3 |
| Fat (g/100 g) | 5.2 ± 0.1 | 5.3 ± 0.0 | 2.4 ± 0.1 |
| Dietary Fibre* (g/100 g) | 24.4 ± 0.1 | 22.6 ± 0.7 | 14.0 ± 0.4 |
| Ash (g/100 g) | 3.1 ± 0.1 | 2.8 ± 0.0 | 0.1 ± 0.0 |
| Moisture (g/100 g) | 9.7 ± 0.0 | 8.7 ± 0.0 | 12.3 ± 0.0 |

Values (wet-weight basis) are means ± SEM (n = 3).

*AOAC method; values include cell wall polysaccharides.

Example 3—Suitability as Food Ingredient

The suitability of the product of the invention as a functional food ingredient with low glycaemic properties can be demonstrated by its digestibility when subjected to in vitro digestion. This product is digested at a significantly slower rate and to a lesser extent than conventional chickpea flour, or indeed other conventional flours (FIG. 3).

The exact digestibility profile is subject to some variation depending on material characteristics, but typically after 90 min, between 20 and 40% of the starch in the cell powders has been digested.

The lowest rate and extent of starch digestion is obtained for coarse cell powders containing clusters of cells. Post-digestion, a high proportion of intact starch-filled cells are still evident when the digested material is examined microscopically (FIG. 3).

Thus it can be expected that ingestion of a meal prepared from pre-cooked cell powder according to the present invention will give a significantly lower glycaemic and insulinemic response compared with an equivalent meal prepared from cooked conventional flour.

Example 4—Plant Materials

For convenience, many of the examples herein, and the description of the invention, have been presented using pulses, notably chickpea seeds. However, the process can also be applied to other pulses generally and a broader range of edible plant materials in the pectin-rich fruit and vegetable category to obtain cell powder materials with similar characteristics (FIG. 4). Selecting materials from different botanical sources based on required characteristics provides scope to control sensory properties, processing performance and nutrient delivery for targeted applications.

Similar results have also been achieved using canned pulses (e.g. chickpeas), in which the hydrothermal treatment occurs during the canning operation (see example digestibility curve for canned chickpea cell powder, FIG. 3).

FIG. 4 shows starch digestibility of cell powders prepared from various other pulses (i.e. various botanical sources) compared with boiled chickpea flour.

Referring to FIG. 4, this shows the invention applied to a diverse range of species:

*Cicer arietinum* L. ('Chickpea')

*Pisum sativum* L. ('Pea', incl. 'Yellow-' and 'Green-split pea')

*Phaseolus lunates* L. (incl. 'Butter bean', also known as Lima bean)

*Lens culinaris* Medikus or syn. *Lens esculenta* Moench (incl. 'Red and Green lentils')

The scientific names of the species in the list above correspond to the common names of the legume samples shown in FIG. 4.

FIG. 4 thus demonstrates that the invention can be worked on a diverse range of plant materials. These can be made into a cellular powder product in which the starch is resistant to digestion as described herein.

Figure 13:
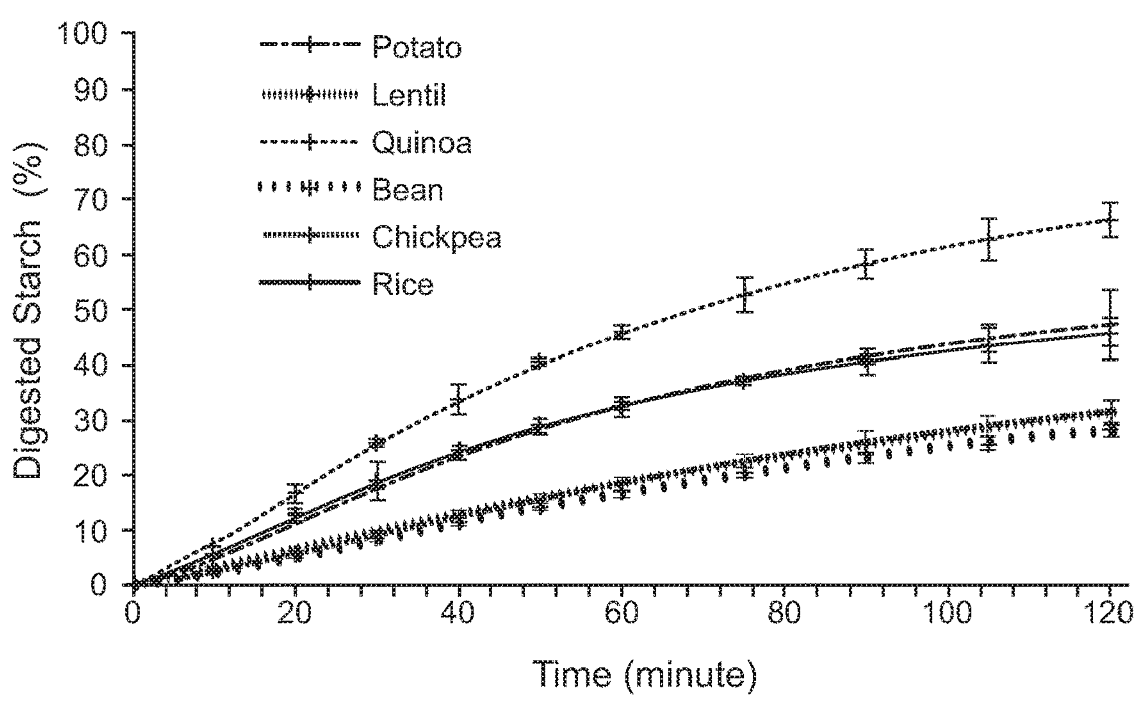
FIG. 13 shows a graph.

We refer to FIG. 13. This is another example performed on a separate occasion which includes kidney beans ('Bean' i.e. *Phaseolus vulgaris* L. (incl kidney beans)), potato, lentil rice and quinoa.

Additional Plant Materials

Additional suitable species include:

Faba beans (*Vicia faba* L),

Pigeon pea (*Cajanus cajan* (L.) Millsp., syn. *Cajanus indicus* Spreng)

Mung bean (*Vigna radiata* (L.) Wilczek, syn. *Phaseolus aureus* Roxb., *Phaseolus radiatus* L.)

Cowpea (*Vigna unguiculata* (L.) Walp., syn. *Vigna sesquipedalis* Fruhw., *Vigna sinensis* (L.) Savi ex Hassk.)

Other species within the *Phaseolus* genus

Potato (*Solanum tuberosum* L., for example cv. Charlotte)

The inventors teach that the similarities in cell wall composition (see for example Gooneratne, J., Needs, P. W., Ryden, P. & Selvendran, R. R. Structural features of cell wall polysaccharides from the cotyledons of mung bean *Vigna radiata*. *Carbohydr. Res.* 265, 61-77, (1994); Mwangwela, A. M., Waniska, R. D. and Minnaar, A., 2006. Hydrothermal treatments of two cowpea (*Vigna unguiculata* L. Walp) varieties: effect of micronisation on physicochemical and structural characteristics. *Journal of the Science of Food and Agriculture,* 86(1), pp. 35-45) conveys to the reader that behaviour upon processing according to the present invention extends to these species.

In addition, the inventors have observed critical properties such as cell separation on processing according to the present invention within these plant materials.

Figure 14:
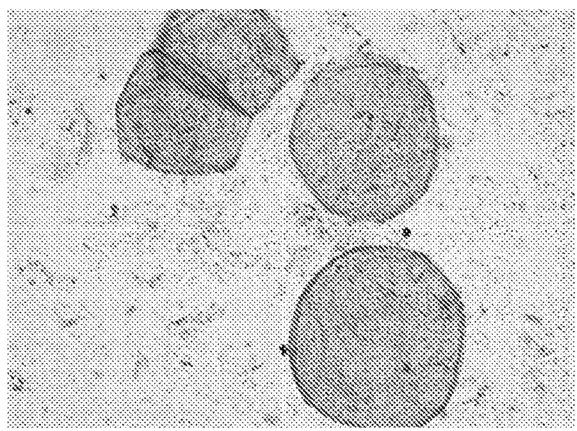
FIG. 14 shows a photomicrograph.

Exemplary results of cell-separation experiments, for example using potato, are provided in FIG. 14.

Example 5—Resistance to Starch Digestion

Considering the product signature characteristics, the product of the invention, such as the dry cell powder product, that we have developed is found to deliver a substantially greater resistance to starch digestion (i.e. lower extent of starch digestibility when subjected to α-amylase hydrolysis) (see FIG. 5).

The product also delivers lower rates of starch digestion compared with prior art ingredients described by other workers (see FIG. 5).

FIG. 5 shows the extent of starch digestibility over a stipulated time period of cell powders of the invention compared to conventional flour as reported by different workers. Starch digestibility data was based on percent digested over 90 min, so that samples with values <100% contain resistant starch. Data were normalised to the internal reference material (i.e. conventional flour or crushed cells) which was set at 100%. Where more than one data point was available, the highest value for percent starch digested was used. Invention is marked "KCL". 'Flour', 'Tosh' and 'Oyman' are prior art products. 'Oyman' refers to the method described in WO2007/0006383. Thus, this comparative data demonstrates advantages of the invention.

Example 6—Exemplary Method

Method for Chickpea Cell Production.

In this example, (a) providing a quantity of plant material comprises:

1. Chickpeas washed with hot water (55-70° C.) with constant change in water for at least 10 minutes.
2. Peas then left and soaked in cold water (<10° C.) for between 12-18 hours.
3. After soaking the chickpeas were washed again in hot water and the chickpeas removed to a steam heated jam pan. Water was added to the jam pan until the water covered the chickpeas.

In this example, (b) heating the material of (a) in aqueous medium to a temperature of 75 to 105° C. comprises:

4. The jam pan was heated until the water was in excess of 95° C. and this temperature (±5° C.) was retained for at least 45-90 minutes.
5. Once the peas were cooked the cooking liquor was drained off and the peas washed in cold water until they reached a temperature below 60° C. Water was then added to the peas at a ratio of 1 part soaked peas to 4 part water.

In this example, (c) physically disrupting the material of (b) comprises:

6. The chickpeas were then homogenised using a stick blender to form a viscous paste and this stored in sealed plastic containers with minimum air space. This paste was stored for between 12 and 30 hours before use in the separators.

In this example, (d) processing the physically disrupted material of (c) to enrich for cells and/or cell clusters comprises:

7. The pastes were transferred to vibratory separators (Virto VP1) fitted with sieves of different screen sizes. The paste was added to the top deck that had a sieve size of approximately 425 μm. Water was used to assist in washing the chickpea paste through this screen. The outer seed coats were retained by this sieve.
8. The washed material that had passed through the initial sieve was then was screened with a sieve of approximately 150 μm. The material retained by this screen was referred to as the chickpea cell material. The materials passing through was the excess water, broken cell fragments and starches released from broken cells.

In this example, (e) drying the enriched material (sieved material) of (d) comprises:

9. The chickpea material was spread onto sheets so that the thickness was not in excess of 1 cm and then placed in a forced air oven at 80° C. After one hour the partially dry material was mixed and spread out once again. The material was dried until it had reached a moisture content of approximately 10%. This is the whole chickpea cell powder.

Optionally:

10. The whole chickpea cell powder could be subsequently ground to form powders of the required particles sizes. The size range 200-350 μm was often found to be optimal.

Example 7—Summary of Comparative Data

Several of the figures provided show comparative data illustrating technical differences/advantages over prior art products. This is made clear in the figure legends below. The product of the invention is occasionally referred to as 'cell powder' herein.

FIG. 1: The tendency of dry tissue to fracture (A) leads to greater cell rupture and release of cellular contents (i.e. starch) which is readily digested (i.e. by amylase into maltodextrins). The tendency of tissues to separate (B), as is the case with hydrated cooked pulses, enables cellular integrity to be preserved, such that the encapsulated starch is not accessible for digestion by amylase.

FIG. 2. Physical appearance (A) and microstructure of cell powders (B) and flour (C) viewed on a light microscope under polarised light.

FIG. 3. Starch digestibility of cell powder materials from chickpeas compared to boiled commercially-milled chickpea flour and light micrographs showing typical appearance of flour (A) and cell powder (B) after digestion.

FIG. 4: Starch digestibility of cell powders prepared from various botanical sources compared with boiled chickpea flour.

FIG. 5: Starch digestibility of cell powders compared to commercially-milled flour and prior art material as reported by different workers (Oyman and Tosh). It should be noted that this figure is based on the data reported in prior art and is the most direct comparison possible. Starch digestibility data was based on percent digested at 90 min, or 100% resistant starch. Data were normalised to the internal reference material (i.e. flour or crushed cells). Where more than one data point was available, the highest value for percent starch digested was used.

Example 8—In Vivo Study

Overview: In this example we show a human dietary study. In vivo data is generated as part of a human dietary intervention study. This demonstrates some of the nutritional properties (e.g. effects on glycaemia and insulinemic and appetite) of the product of the invention. Ethical approval has been obtained. The study design is a randomised controlled trial in which healthy participants receive nutritionally matched test meals (hummus made from cell powder vs. flour) on separate occasions. Postprandial blood glucose and insulin responses are monitored for up to 4 h after the meal.

Study Outline:

A randomised cross over trial of 15 healthy male participants was designed to compare the postprandial effects of 3 test meals containing 26.8 g starch, provided as a hummus meal containing the ingredient (product according to the invention), known flour or canned chickpeas. Postprandial blood glucose and insulin responses were primary outcomes, with gut hormone responses and appetite scores a secondary outcomes. Blood samples and analysis was performed as described in Edwards et al 2015 Amer J Clin Nutr 102:791-800.

Figure 7:
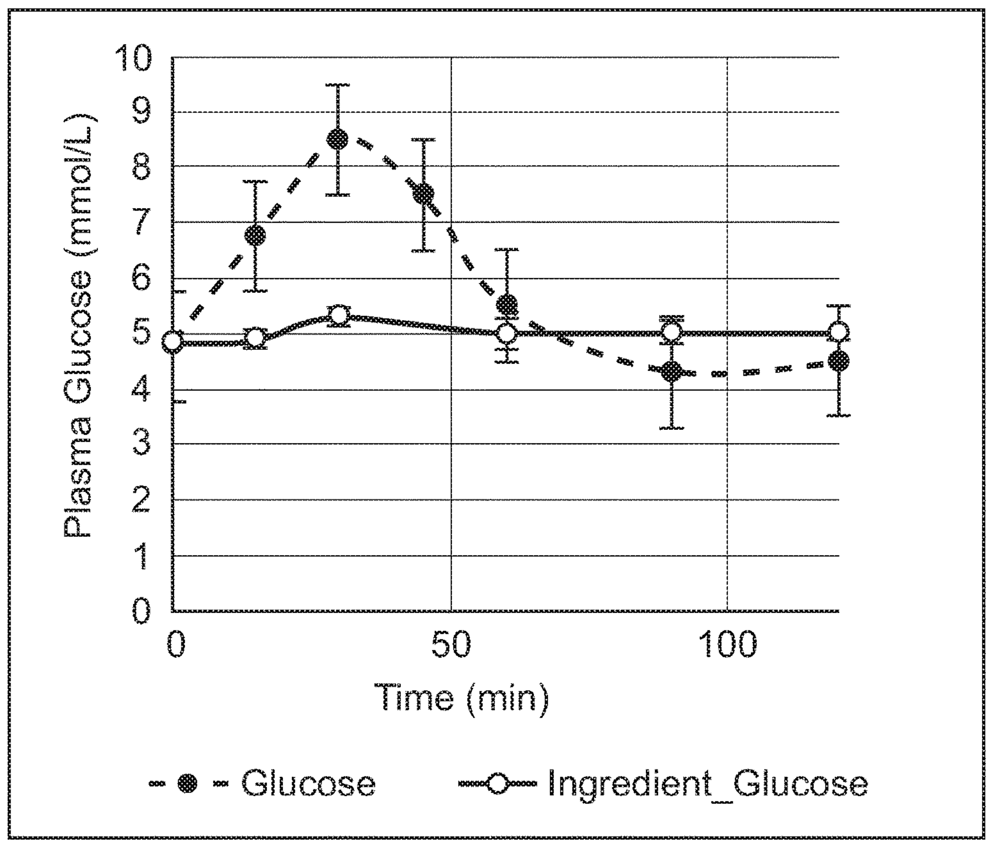
FIG. 7 shows incremental postprandial blood glucose concentrations (mean+standard error) from 15 healthy males in response to a test meal (25 g starch) made with the Product (chickpea cell powder) as the carbohydrate source. Figure shows in vivo data showing low glycaemic effects of the product of the invention. Data is plotted together with published data from a different cohort showing the glycaemic response (n=8) to a matched carbohydrate load of glucose (Lee & Wolever, 1998, Europ J Clin Nutr 52:924-928).

We refer to FIG. 7 which shows low glycaemic effects: In vivo data from 15 healthy male participants showing the average incremental postprandial blood glucose response to a test meal (25 g starch) made with the ingredient (product according to the invention) as the carbohydrate source. The experimental data is plotted together with published data from a different cohort showing the glycaemic response (n=8) to a matched carbohydrate load, provided as a 25 g glucose solution (Lee & Wolever, 1998, Europ J Clin Nutr 52:924-928). Error bars show standard error of the mean.

Key results: The study demonstrated that when the ingredient (product according to the invention) was fed as part of this meal, a low glycaemic response was observed.

Example 9—Comparative Example

Spray drying is not suitable for use in the invention. Prior art spray drying of the material can make the cells porous and/or disrupt the cells so that they are no longer intact. This is a drawback of prior art approaches such as disclosed in Tosh et al. 2013.

Figure 9:
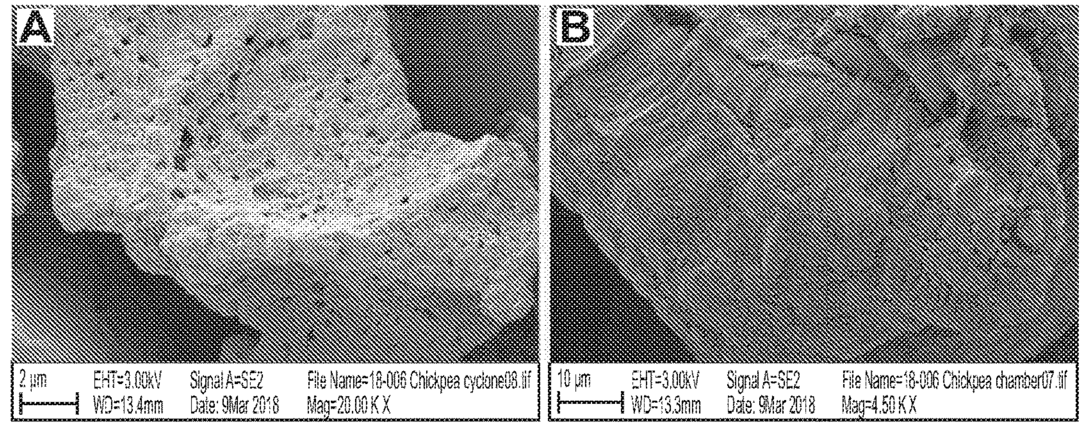
FIG. 9 shows a Scanning Electron Micrograph of spray dried material (not part of the invention—see examples).

Prior art spray drying causes increased porosity and increased rate of starch digestion. We refer to FIG. 9 (spray dried—not part of the invention—comparative evidence). FIG. 9 shows Scanning Electron Micrographs of spray dried chickpea paste recovered from A) Cyclone and B) Main Chamber. Pores are clearly evident in the cell walls from the cyclone. Specimen preparation: Powder was mounted to SEM stubs via sticky tabs and gold-coated for 50 sec (no fixation or dehydration as the sample was already dry).

Figure 8:
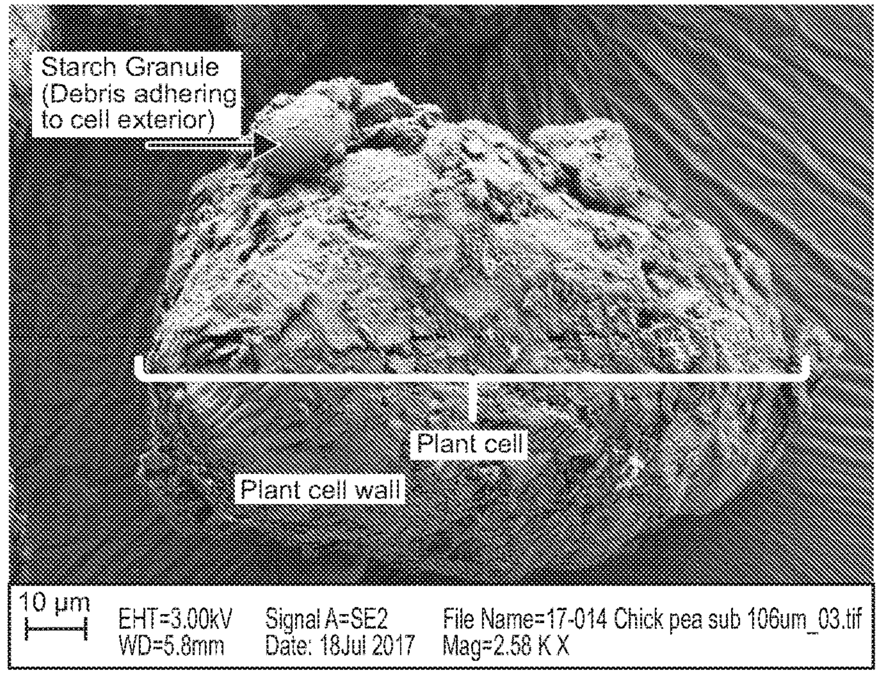
FIG. 8 shows a Scanning Electron Micrograph of an intact cell in the chickpea powder.

By contrast, the excellent intact material of the invention may be seen in FIG. 8 (invention—no spray drying).

Example 10: Exemplary Drying Step

In this example, the plant material is chickpea and the material of (d) is chickpea paste. In this example, (e) drying the material (enriched/sieved material) of (d) comprises:

Roller drying was performed by loading chickpea paste onto double-drum roller (dimensions of each drum: length=300 mm, radius=150 mm, and a 250 μm separation gap with a nip to blade angle 180°) at a rotation speed 2.62 rpm (23 s/revolution) and steam pressure 1 bar over atmospheric to achieve a drying time of 11 s.

In this example the roller-dryer was a 2 drum drier, supplier: Tummers (Simon Dryers) Ltd (Colwick Industrial Estate, Nottingham, NG4 2BD, England, UK).

Further Examples of Drying:

In one example, when drying plant cell material over an area of 41 m2/h, and with a feed rate of 15 kg/h a drying rate of 11 kg/h was achieved.

Greater efficiency is likely to be achieved, for example, with higher pressure and faster roller speed, so that a feed rate of 45 kg/h could potentially dry 30 kg of cell paste per hour.

Limits of operation will be known to the skilled worker paying attention to the guidance provided herein, but in case any further direction is needed, it should be noted that roller drying will not work if misconfigured so that the gap between the drums is smaller than the cell dimensions (because the cells will be crushed between the rollers);

roller drying will not work if misconfigured so that the steam pressure is so high that the paste boils at the nip.

ADVANTAGE/EVIDENCE: A high proportion of intact cells and starch resistance (c90=<30%, similar rate of digestion to oven-dried batches) was observed when this protocol was used.

Example 11: Exemplary Foodstuffs

The product of the invention finds application as an ingredient in foodstuffs. For example the product has been included as a wheat flour displacer in foodstuffs that are commonly prepared with wheat flour.

A proportion of the wheat flour (various doses ranging from 10 to 90% w/w) has been substituted with product of the invention (in this example when the plant material is chickpea) in the following products: Loaf bread, muffin, scone, chemically-leavened and yeast-leavened flat breads In addition a 100% substitution of wheat or oat flour with product of the invention has been achieved in biscuits, cupcakes, flat bread and cookies.

Light and confocal microscopy of baked products confirmed that the cellular integrity was retained in the final end-product, and that Type 1 RS was present even after secondary processing.

Figure 10:
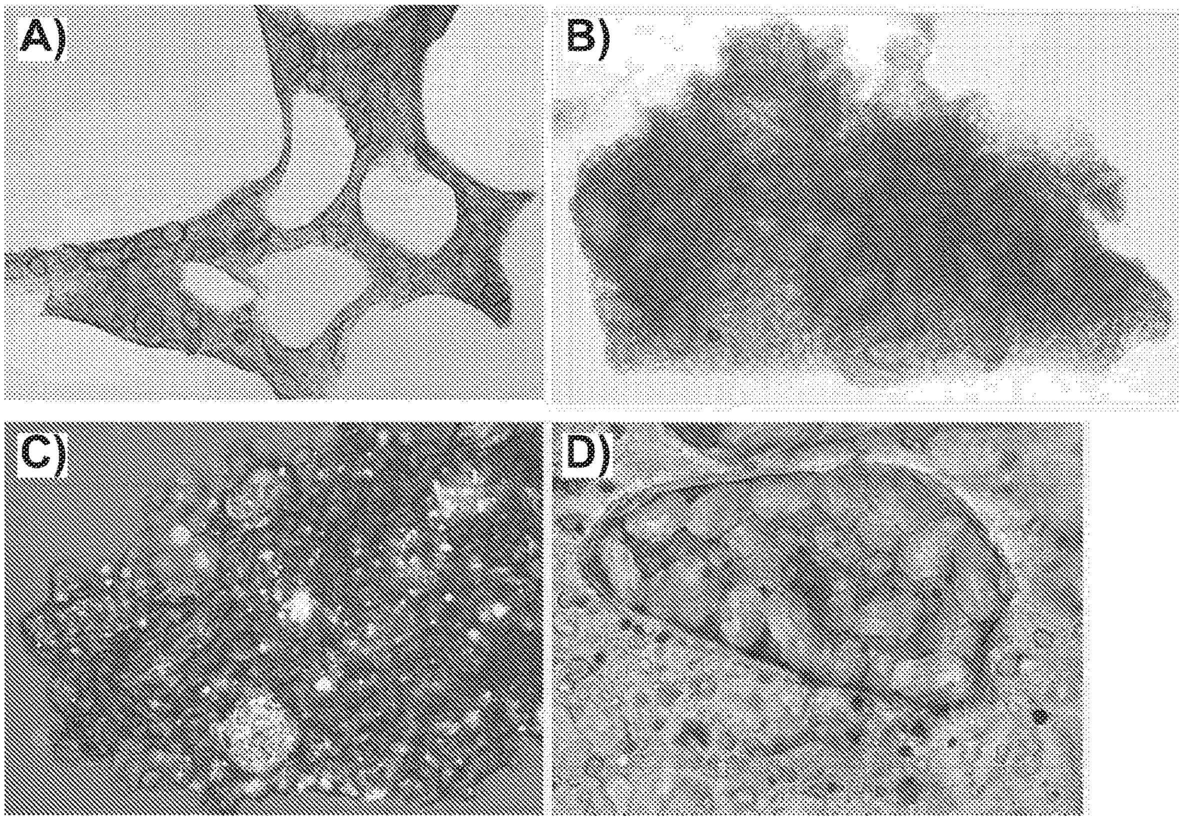
FIG. 10 shows light micrographs. In more detail.

This is evidenced in FIG. 10, which shows light micrographs showing intact plant cells present in baked loaf bread in which 30% wheat flour was displaced with chickpea powder. A) Bread crumb: Cellular structures are evident in matrix surrounding bubble structures; B) Bread crust: Cellular structures are evident amongst native wheat starch granules; C) Bread crumb: Observed bi-refringence (crystallinity) varies between cells; D) Bread crumb: Cell wall and partially swollen starch granules Foodstuffs comprising the product of the invention were demonstrated to be digested more slowly compared with the original prior art wheat-flour product. This is associated with an increase in resistant starch (RS90) and a lower predicted Glycaemic Index.

This is evidenced in FIGS. 11A and 11B for loaf bread.

FIG. 11A shows that substituting % (w/w) of wheat flour with chickpea ingredient increases resistant starch and reduces starch digestibility and thereby predicted GI.

FIG. 11B has been updated to reflect additional data which takes into account exact moisture content of food product when analysed (most accurate values).

Thus FIG. 11B shows starch digestibility curves of loaf breads in which 0, 30, 40, 50, 60 and 90% of the wheat bread flour has been substituted with product according to the present invention (in this example prepared from chickpea). Starch digestibility values are the mean of at least triplicate analyses with standard deviation and have been adjusted to exclude endogenous reducing sugars present at baseline. Starch in loaf bread becomes less digestible and more resistant to digestion as the proportion of wheat flour that is substituted with product according to the present invention (in this example 'chickpea flour') increases.

An informal sensory panel test found that the resulting products had acceptable sensory attributes ('just about right' analysis), and enriched products were not beany, nor metallic.

Below is a table with sensory responses when informal panel tasted products in which 100% of wheat was displaced with product according to the present invention (in this example from chickpea). These are the same products that are shown in Table B.

TABLE A

Responses from taste test of biscuit (cookie) and cake recipe in which 100% of the wheat flour has been substituted with chickpea ingredient.

| 100% substitution Cookie Recipe | 100% substitution Cupcake Recipe |
|---|---|
| Crumbly, short texture<br>Slightly dry around the edges<br>Nice gooey centre<br>No-one guessed they were Gluten Free. | Nobody guessed they were all Gluten Free.<br>Or that they were made with a Chickpea derivative. |

Figure 15:
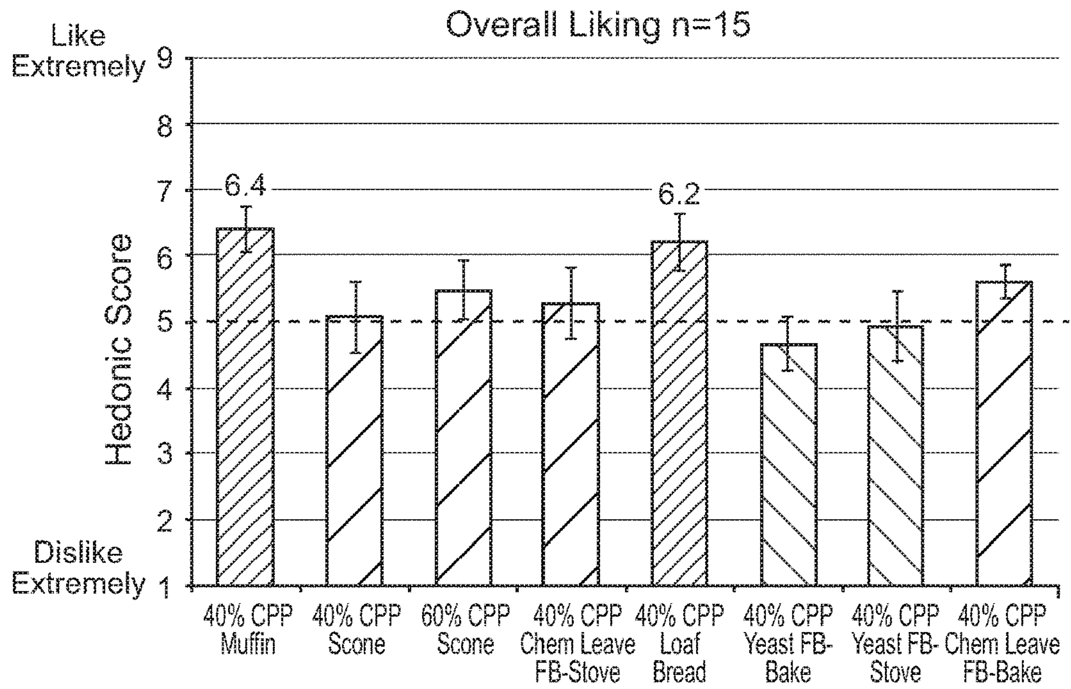
FIG. 15 shows a bar chart. In more detail, shown are overall hedonic scores from informal panel (n=15) assessment of products enriched with product according to the present invention (in this example from chickpea).

We refer to FIG. 15. Products were scored by an informal panel (n=15) based on overall liking, aroma, colour, flavour, saltiness, oiliness, texture. The average hedonic score is given below, on a scoring scale where 1=dislike extremely and 9=like extremely). The best performing products were the 40% Loaf bread and muffin in which 40% of the wheat flour had been displaced with product according to the present invention (in this example from chickpea), and all foodstuff products scored above the median. A preference test evaluated sensory attributes for aroma (cheesy, beany, metallic), texture (hard, dry, doughy, oily) and flavour (saltiness, sweetness, cheesiness, bitterness, metallic), and the penalty scores associated with these attributes were low (<2) based on responses from Just about Right analysis, with no changes need to the formulation of the 40% bread/muffin.

In addition to the taste test (Table A and FIG. 15), we present nutrient composition of 100% substituted cupcake, flatbread and cookie (Table B).

This also represents Comparative Examples since the foodstuffs of the invention are compared to prior art (wheat flour) foodstuffs.

(Note 'CHO' is an abbreviation for carbohydrate)

In formulations where wheat is the only source of gluten (such as foodstuff products shown in Table B), replacing all wheat with product according to the present invention (in this example from chickpea) results in a gluten-free product. The products shown in Table A represent food products that have been prepared and used in an informal sensory panel, where participants did not guess that these products were gluten-free.

Table B shows effect of substituting wheat flour with product according to the present invention (in this example from chickpea) on overall nutrient composition of food products. For the cookie, cupcake and flatbread recipes, replacing all wheat with the product according to the present invention (in this example from chickpea) reduces the starch (and therefore carbohydrate) content and increases dietary fibre content.

TABLE B

| | COOKIE | | CUPCAKE 100% | | FLATBREAD | |
|---|---|---|---|---|---|---|
| | 0% Wheat (prior art) | 100% 100% of wheat substituted with Ingredient | 0% Wheat (prior art) | 100% of wheat substituted with Ingredient | 0% Wheat (prior art) | 100% 100% of wheat substituted with Ingredient |
| Energy (kJ/100 g dry matter) | 1993.4 | 2277.9 | 2053.4 | 2052.1 | 1814.6 | 1811.7 |
| Energy (kcal/100 g dry matter) | 476.4 | 544.4 | 490.8 | 490.4 | 433.7 | 433.0 |
| Protein (g/100 g dry matter) | 12.8 | 8.6 | 27.4 | 28.9 | 34.0 | 37.3 |
| Fat (g/100 g dry matter) | 17.3 | 32.4 | 22.6 | 23.7 | 12.5 | 14.8 |
| CHO (g/100 g dry matter) | 69.4 | 56.5 | 48.3 | 41.7 | 47.8 | 33.5 |
| of which Starch (g/100 g dry matter) | 47.6 | 18.2 | 19.3 | 12.9 | 47.5 | 33.4 |
| of which Sugar (g/100 g dry matter) | 21.6 | 36.3 | 27.4 | 27.3 | 0.3 | 0.1 |
| Fibre (g/100 g dry matter) | 2.7 | 4.8 | 0.9 | 3.3 | 2.8 | 7.9 |
| Moisture (g/100 g dry matter) | 0 | 0 | 0 | 0 | 0 | 0 |
| Key points | | 19% less CHO and 45% more dietary fiber than with wheat | | 14% less CHO and 71% more dietary fiber than with wheat | | 30% less CHO and 64% more dietary fiber than with wheat |

Example 12: Cell Counting—Intact/Broken Cells

Product was prepared in various batches as described in example 6.

Intact/Broken cells were analysed using the “Cell Counting Protocol—Laser Diffraction Methodology” as described above.

Figure 12:
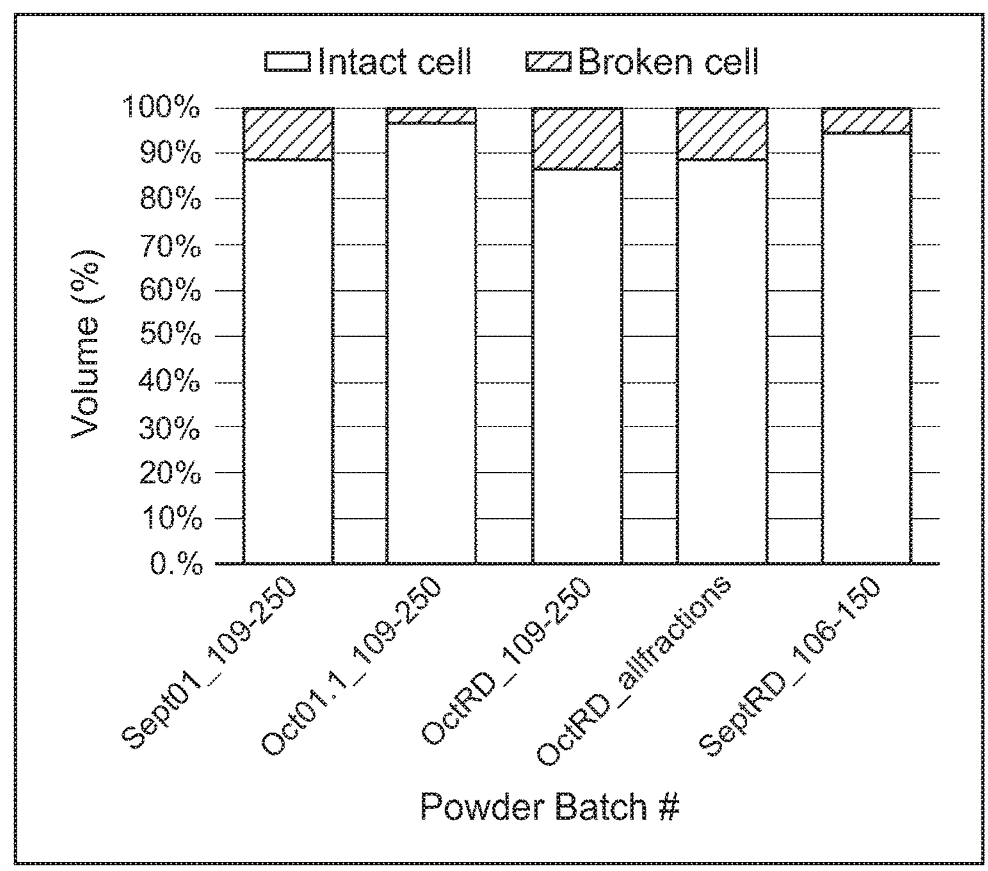
FIG. 12 shows a chart. In more detail.

We refer to FIG. 12.

FIG. 12 shows the proportion of intact and broken cells in product of the invention (in this example chickpea powder) across various different preparations. Particles ≥50 μm and ≤250 μm “intact cells” and <50 μm broken cells.

Example 13: Further Exemplary Foodstuffs

This example also presents Comparative Examples since the foodstuffs of the invention are compared to prior art (wheat flour) foodstuffs.

Figure 16:
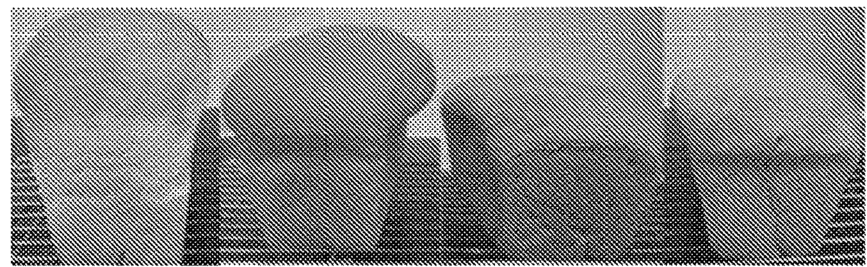
FIG. 16 shows photographs. In more detail, shown is the effect of displacing wheat flour with product according to the present invention (in this example from chickpea) on product quality.

Product application LOAF BREAD (as referred to in Table C): Displacement of white wheat bread flour with product according to the present invention (in this example from chickpea) in loaf bread formulations is associated with reduction in loaf specific volume and increase in brownness of the crust (FIG. 16).

An example of the effect of displacing different proportions of the wheat flour with product according to the present invention (in this example from chickpea) in a Yeasted Flatbread (‘dose-response’) is given in Table C. These products have also been analysed for starch digestibility, and would be expected to have a low glycaemic index at the lowest dose tested (i.e. 30% substitution of wheat flour in this example).

Table C shows the effect of substituting different proportions of the wheat flour with product according to the present invention (in this example from chickpea) on nutrient composition of a flatbread food product. The effect is dose-dependent and improvements in starch and fibre content are evident even when only 30% of the wheat is displaced by product according to the present invention (in this example from chickpea).

Figure 17:
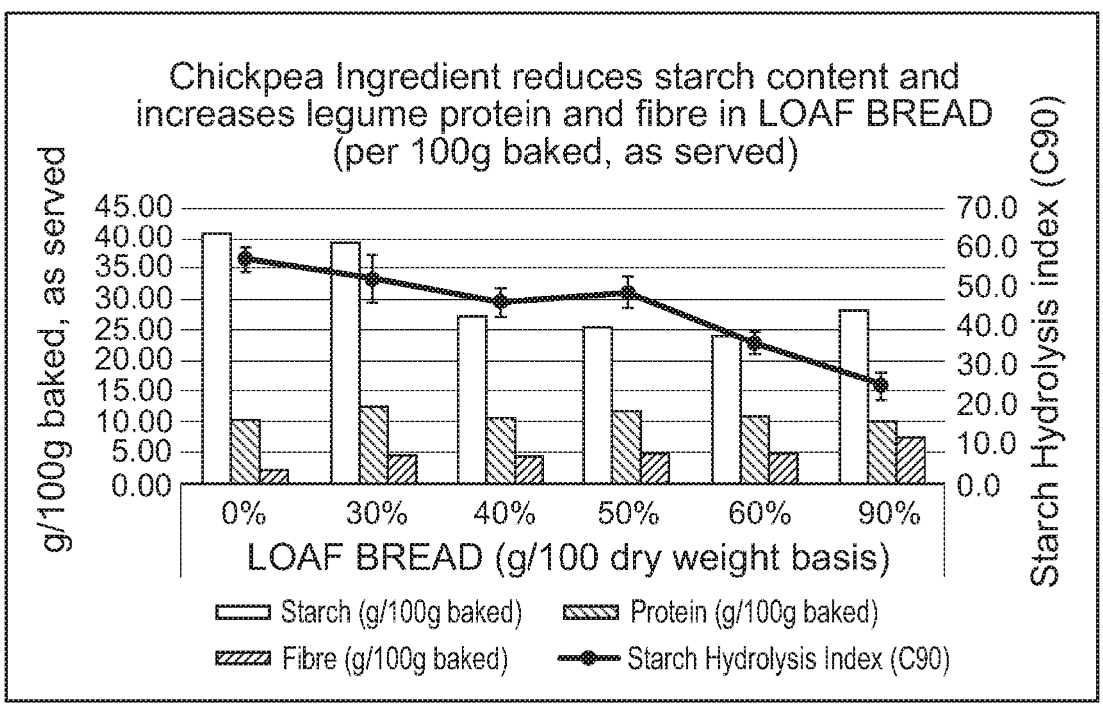
FIG. 17 shows a bar chart/graph.
Figure 18:
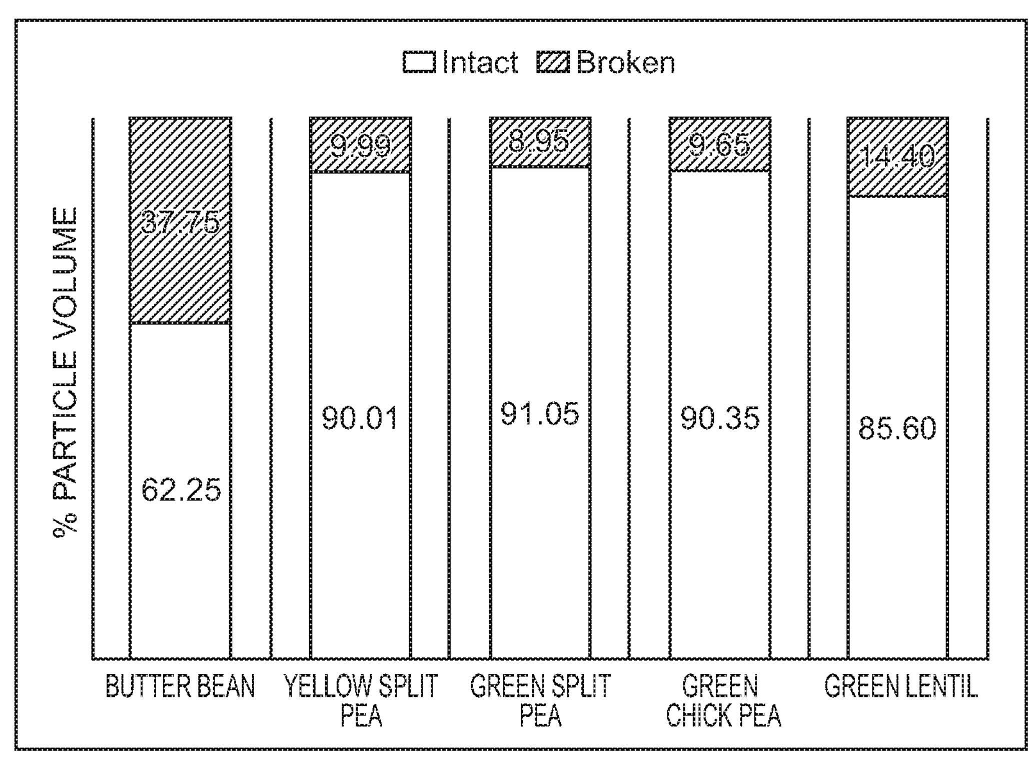
FIG. 18 shows a bar chart of % intact cells.

We refer also to FIG. 17.

TABLE C

| | YEASTED FLATBREAD | | | |
|---|---|---|---|---|
| | 0% | 30% | 60% | 90% |
| Energy (kJ/100 g baked) | 1402.2 | 1216.6 | 1154.2 | 815.0 |
| Energy (kcal/100 g baked) | 335.1 | 290.8 | 275.9 | 194.8 |
| Protein (g/100 g baked) | 14.0 | 13.5 | 15.3 | 8.7 |
| Fat (g/100 g baked) | 3.8 | 4.6 | 5.5 | 4.8 |
| CHO (g/100 g baked) | 58.4 | 45.2 | 36.4 | 25.5 |
| of which Starch (g/100 g baked) | 55.6 | 43.0 | 34.5 | 24.1 |
| of which Sugar (g/100 g baked) | 2.6 | 2.1 | 1.8 | 1.3 |
| of which Fibre (g/100 g baked) | 3.0 | 5.0 | 6.9 | 6.3 |
| Moisture (g/100 g baked) | 19.5 | 30.4 | 34.4 | 53.6 |

TABLE C-continued

| | YEASTED FLATBREAD | | | |
|---|---|---|---|---|
| | 0% | 30% | 60% | 90% |
| Starch Hydrolysis Index (C90, mean ± sd) | 44.9 ± 2.8 | 18 ± 9.6 | 14.7 ± 1.7 | 27.9 ± 1.7 |
| Key points | (wheat only) | 23% less CHO and 41% more fiber than pure wheat product | 38% less CHO and 57% more fiber than pure wheat product | 56% less CHO and 53% more fiber than pure wheat product |

Another example of the dose-response relationship in loaf bread is given in Table D. The nutritional benefits increase as greater proportions of the wheat flour are substituted with product according to the present invention (in this example from chickpea). At the lowest dose (30% substitution of wheat with product according to the present invention (in this example from chickpea)), the fibre content is greatly improved compared to wheat bread. The reduction in starch hydrolysis index (C90) is associated with a lower expected glycaemic index, and is particularly evident when higher proportions of the wheat flour is substituted with product according to the present invention (in this example from chickpea).

Table D shows the effect of substituting wheat flour in white loaf bread with different doses of product according to the present invention (in this example from chickpea).

TABLE D

| | LOAF BREAD (g/100 g baked) | | | | | |
|---|---|---|---|---|---|---|
| | 0% | 30% | 40% | 50% | 60% | 90% |
| Energy (kJ/100 g baked) | 1031.21 | 1116.95 | 856.70 | 864.72 | 805.84 | 953.72 |
| Energy (kcal/100 g baked) | 246.46 | 266.95 | 204.75 | 206.67 | 192.60 | 227.94 |
| Protein (g/100 g baked) | 10.29 | 12.39 | 10.65 | 11.79 | 10.70 | 10.13 |
| Fat (g/100 g baked) | 2.81 | 4.22 | 3.55 | 3.83 | 3.87 | 5.61 |
| CHO (g/100 g baked) | 42.92 | 41.47 | 29.55 | 27.92 | 25.43 | 29.82 |
| of which Starch (g/100 g baked) | 40.88 | 39.44 | 27.27 | 25.62 | 24.08 | 28.17 |
| of which Sugar (g/100 g baked) | 1.94 | 1.91 | 2.19 | 2.20 | 1.26 | 1.52 |
| Fibre (g/100 g baked) | 2.18 | 4.64 | 4.15 | 4.62 | 4.84 | 7.42 |
| Moisture (g/100 g baked) | 40.80 | 36.10 | 51.20 | 50.90 | 54.20 | 45.70 |
| Starch Hydrolysis Index (C90 mean ± sd) | 56.7 ± 3.33 | 52.0 ± 6.3 | 47.0 ± 3.72 | 48. ± 3.84 | 35.8 ± 2.85 | 24.7 ± 3.42 |
| | | 3% less CHO and 53% more fiber than pure wheat product | 31% less CHO and 47% more fiber than pure wheat product | 35% less CHO and 53% more fiber than pure wheat product | 41% less CHO and 55% more fiber than pure wheat product | 31% less CHO and 71% more fiber than pure wheat product |

The invention claimed is:

1. A product which comprises at least 30% or more intact plant cells, which comprises 15% or less water by weight, which has a particle size in a range 50-500 μm, characterised in that the product comprises at least 20% resistant starch as a proportion of total starch, wherein said resistant starch is RS1 type resistant starch contained within the intact plant cells.

2. A product according to claim 1 which has a particle size in the range 75-500 μm, characterised in that the product comprises at least 30% resistant starch as a proportion of total starch.

3. A product according to claim 1 wherein said product comprises at least 64% intact plant cells.

4. A product according to claim 1 wherein said product comprises at least 80% resistant starch, as a proportion of total starch.

5. A product according to claim 1 wherein said product comprises 35-85 g starch per 100 g product.

6. A product according to claim 1 wherein said product comprises 8 to 14% water by weight.

7. A product according to claim 1 wherein said product comprises <10% water by weight.

8. A product according to claim 7 wherein said product comprises <5% water by weight.

9. A product according to claim 1 wherein said product is a powder.

10. A product according to claim 1 wherein said plant cells comprise chickpea (*Cicer arietinum*) cells.

11. A product according to claim 1 wherein said product is obtained by a process comprising:

a. providing a quantity of plant material;
b. heating the material of (a) in aqueous medium to a temperature of 75 to 105° C.;
C. physically disrupting the material of (b);
d. processing the physically disrupted material of (c) by sieving to obtain particles in the size range 20 μm to 4 mm; and
e. drying the material of (d).

12. A foodstuff comprising a product according to claim 1.

13. A foodstuff according to claim 12 wherein said foodstuff is selected from the group consisting of: a biscuit, a cracker, a wafer, a cake, a smoothie, a pasta, a noodle, a baked goods, an extruded cereal, a beverage, an infant nutrition product, a sports nutrition product, and a high protein product.

14. A foodstuff according to claim 12 wherein said foodstuff is a foodstuff having a glycaemic index selected from the group consisting of: 69 or less, 60 or less, and 55 or less.

* * * * *